(12) United States Patent
Luo et al.

(10) Patent No.: US 11,212,732 B2
(45) Date of Patent: Dec. 28, 2021

(54) COMMUNICATIONS METHOD AND APPARATUS, AND RADIO ACCESS NETWORK

(71) Applicant: HUAWEI TECHNOLOGIES CO., LTD., Guangdong (CN)

(72) Inventors: Haiyan Luo, Shanghai (CN); Man Wang, Shanghai (CN); Wenjie Peng, Shanghai (CN)

(73) Assignee: Huawei Technologies Co., Ltd., Guangdong (CN)

( * ) Notice: Subject to any disclaimer, the term of this patent is extended or adjusted under 35 U.S.C. 154(b) by 192 days.

(21) Appl. No.: 16/712,077

(22) Filed: Dec. 12, 2019

(65) Prior Publication Data

US 2020/0120576 A1 Apr. 16, 2020

Related U.S. Application Data

(63) Continuation of application No. PCT/CN2018/090813, filed on Jun. 12, 2018.

(30) Foreign Application Priority Data

Jun. 12, 2017 (CN) .......................... 201710436650.4

(51) Int. Cl.
*H04W 40/36* (2009.01)
*H04W 76/12* (2018.01)
(Continued)

(52) U.S. Cl.
CPC ........ *H04W 40/36* (2013.01); *H04W 36/0011* (2013.01); *H04W 40/248* (2013.01);
(Continued)

(58) Field of Classification Search
None
See application file for complete search history.

(56) References Cited

U.S. PATENT DOCUMENTS 10,027,573 B2 * 7/2018 Shaw .................. H04L 67/2814
2016/0330612 A1 11/2016 Mildh et al.
(Continued)

FOREIGN PATENT DOCUMENTS

CN 103889009 A 6/2014
CN 103987046 A 8/2014
(Continued)

OTHER PUBLICATIONS

Ericsson et al., "Transmission of RRC messages", 3GPP Draft, R3-171726, XP051265621, May 6, 2017, 3 pages.
(Continued)

*Primary Examiner* — Brian S Roberts
(74) *Attorney, Agent, or Firm* — Fish & Richardson P.C.

(57) ABSTRACT

A second access network node sends endpoint information of a second transmission path on the second access network node side to the first access network node. The second transmission path is a transmission path that is between the second access network node and a third access network node. The third access network node sends endpoint information of the second transmission path on the third access network node side to the first access network node. The first access network node sends the endpoint information of the second transmission path on the third access network node side to the second access network node, and sends the endpoint information of the second transmission path on the second access network node side to the third access network node.

20 Claims, 7 Drawing Sheets

(51) Int. Cl.
  *H04W 76/15*    (2018.01)
  *H04W 36/00*    (2009.01)
  *H04W 40/24*    (2009.01)
  *H04W 88/08*    (2009.01)

(52) U.S. Cl.
  CPC ........... *H04W 76/12* (2018.02); *H04W 76/15* (2018.02); *H04W 88/08* (2013.01)

(56) References Cited

U.S. PATENT DOCUMENTS

| | | | |
|---|---|---|---|
| 2017/0086049 A1 | 3/2017 | Vrzic | |
| 2018/0249388 A1 | 8/2018 | Baek et al. | |
| 2020/0029390 A1* | 1/2020 | Han | H04W 80/00 |
| 2020/0367315 A1* | 11/2020 | Gao | H04W 76/11 |

FOREIGN PATENT DOCUMENTS

| | | | |
|---|---|---|---|
| CN | 104869666 A | 8/2015 | |
| CN | 106162730 A | 11/2016 | |
| WO | 2017034269 A1 | 3/2017 | |
| WO | 2017081518 A1 | 5/2017 | |

OTHER PUBLICATIONS

Ericsson, "On the functional distribution over the F1 interface", 3GPP Draft, R3-171727,XP051265622, May 6, 2017, 10 pages.
Extended European Search Report issued in European Application No. 18817319.9 dated May 8, 2020, 9 pages.
CATT, "Stage 2 TP for ANR and Xn setup," 3GPP TSG RAN WG3#96, R3-171466, Hangzhou, China, May 15-19, 2017, 17 pages.
Office Action issued in Japanese Application No. 2020-518118 dated Jan. 19, 2021, 6 pages (with English translation).
ZTE, "Discussion on gNB-eNB interface setup," 3GPP TSG RAN WG3#96, R3-171606, Hangzhou, China, May 15-19, 2017, 4 pages.
Office Action issued in Indian Application No. 201937053284 dated Mar. 19, 2021, 6 pages.
Deutsche Telekom et al., "Joint Text Proposal for 38.801 on CP/UP separation", 3GPP TSG-RAN WG3#93-Bis, R3-162618, Sophia Antipolis, France, Oct. 10-14, 2016, 4 pages.
PCT International Search Report and Written Opinion in International Application No. PCT/CN2018/090,813, dated Aug. 28, 2018, 17 pages (With English Translation).

* cited by examiner

COMMUNICATIONS METHOD AND APPARATUS, AND RADIO ACCESS NETWORK

CROSS-REFERENCE TO RELATED APPLICATIONS

This application is a continuation of International Application No. PCT/CN2018/090813, filed on Jun. 12, 2018, which claims priority to Chinese Patent Application No. 201710436650.4, filed on Jun. 12, 2017. The disclosures of the aforementioned applications are hereby incorporated by reference in their entireties.

TECHNICAL FIELD

This application relates to the communications field, and more specifically, to a communications method and apparatus, and a radio access network.

BACKGROUND

In a cloud radio access network (CRAN) architecture, a base station may be divided into a control unit (CU) and a data unit (DU). The CU may be also referred to as a central unit (CU), and the DU may be also referred to as a distributed unit (DU). The CU may have some of or all radio resource control (RRC) layer functions, and may have further have functions of one or more protocol layers below an RRC layer. The DU may have some of or all physical layer functions, or further have functions of one or more protocol layers above a physical layer. In addition, a user plane (UP) function and a control plane (CP) function may be further separate inside the CU. With foregoing function division, a quantity of interfaces between access network devices increases, and an existing solution for communication between the CU and the DU is no longer applicable.

SUMMARY

This application provides a communication method and a communications apparatus, to be applicable to a scenario in which functions of an access network device are separated.

According to a first aspect, a communication method is provided, including: obtaining, by a first access network node, endpoint information of a second transmission path on a second access network node and endpoint information of the second transmission path on a third access network node; sending, to the third access network node, the endpoint information of the second transmission path on the second access network node; and sending, to the second access network node, the endpoint information of the second transmission path on the third access network node.

According to the communication method, a transmission path corresponding to a DRB can be established between the second access network node and the third access network node, thereby establishing a user plane.

Optionally, the first access network node sends a first request to the third access network node, and receives a first response to the first request from the third access network node.

In a possible implementation of the first aspect, the first access network node sends a second request to the second access network node, and receives a second response to the second request from the second access network node.

In this case, optionally, establishment of the transmission path corresponding to the DRB may be initiated by the first access network node.

Optionally, the first request and the second request may be used to request to establish a transmission path that is between the second access network node and the third access network node and that is corresponding to the DRB, that is, request to establish the second transmission path.

Optionally, on a core network side, the DRB may be corresponding to an E-RAB or a PDU session.

Optionally, the first response and the second response may respectively include configuration information that is of the transmission path corresponding to the DRB and that is on the third access network node and configuration information that is of the transmission path corresponding to the DRB and that is on the second access network node, for example, endpoint information.

Optionally, the first response may include the endpoint information that is of the second transmission path corresponding to the DRB and that is on the third access network node, and the second response may include the endpoint information that is of the second transmission path corresponding to the DRB and that is on the second access network node, for example, a TEID.

Optionally, the sending, by the first access network node, a second request to the second access network node includes: after receiving the first response, sending, by the first access network node, the second request to the second access network node, where the second request includes the endpoint information of the second transmission path on the third access network node side.

In this case, after receiving the second response to the second request from the second access network node, the first access network node may send, to the third access network node, the endpoint information of the second transmission path on the second access network node side.

In this case, the first access network node first sends the first request to the third access network node, and after receiving the first response, sends the second request to the second access network node.

Optionally, the sending, by the first access network node, a first request to the third access network node includes: after receiving the second response, sending, by the first access network node, the first request to the third access network node, where the first request includes the endpoint information of the second transmission path on the second access network node side.

In this case, after receiving the first response to the first request from the third access network node, the first access network node may send, to the second access network node, the endpoint information of the second transmission path on the third access network node side.

In this case, the first access network node first sends the second request to the second access network node, and after receiving the second response, sends the first request to the third access network node.

In a possible implementation of the first aspect, the obtaining, by a first access network node from a second access network node, endpoint information of a second transmission path on the second access network node side includes: receiving, by the first access network node, a third request sent by the second access network node, where the third request includes the endpoint information of the second transmission path on the second access network node side and first indication information indicating a mapping relationship between the DRB and a flow; and the sending, by the first access network node to the second access network node, the endpoint information of the second transmission path on the third access network node side includes: sending, by the first access network node, a third response to the second access network node based on the third request.

In this case, optionally, establishment of the transmission path corresponding to the DRB may be initiated by the second access network node.

Optionally, the third response includes the endpoint information of the second transmission path on the third access network node side.

Optionally, after receiving the third request, the first access network node may send the first request to the third access network node.

Optionally, after receiving the first response, the first access network node may send the third response to the second access network node.

Optionally, the first access network node may further send second indication information to a terminal device by using the third access network node, where the second indication information is used to indicate a mapping relationship between the DRB and the flow.

The second indication information may be used to indicate at least one flow mapped to the DRB.

Optionally, before the sending a second request to the second access network node, the method further includes: obtaining, by the first access network node, QoS information of a flow; and determining, by the first access network node based on the QoS information of the flow, that the flow is mapped to the DRB.

In this case, optionally, the second request may include first indication information, and the first indication information indicates a mapping relationship between the DRB and the flow.

Optionally, the first access network node may obtain the QoS information of the flow from the core network. For example, the first access network node may receive, from the core network, control signaling that includes the QoS information of the flow.

Optionally, the first access network node may obtain the QoS information of the flow from the second access network node. For example, the first access network node may obtain, from the second access network node, signaling that includes the QoS information of the flow.

Optionally, after obtaining the QoS information of the flow, the first access network node may perform admission control on the flow, and after determining to accept the flow, send the second request to the second access network node.

Optionally, the method further includes: receiving, by the first access network node from the second access network node, first indication information used to indicate a mapping relationship between the DRB and a flow.

According to a second aspect, another communication method is provided, including: sending, by a second access network node to a first access network node, endpoint information of a second transmission path on the second access network node side; and receiving, by the second access network node from the first access network node, endpoint information of the second transmission path on a third access network node side.

In a possible implementation of the second aspect, the second access network node may receive a second request from the first access network node, and the second access network node sends a second response to the first access network node based on the second request.

Optionally, the second response includes the endpoint information of the second transmission path on the second access network node side.

Optionally, after sending, to the first access network node, the endpoint information of the second transmission path on the second access network node side, the second access network node may receive, from the first access network node, the endpoint information of the second transmission path on the third access network node side.

Optionally, the second request may include the endpoint information of the second transmission path on the third access network node side. In this case, after receiving the endpoint information of the second transmission path on the third access network node side, the second access network node sends, to the first access network node, the endpoint information of the second transmission path on the second access network node side.

In a possible implementation of the second aspect, the second access network node may send a third request to the first access network node, where the third request includes the endpoint information of the second transmission path on the second access network node side and indication information indicating a mapping relationship between a flow and a DRB.

In this case, optionally, the second access network node receives a third response to the third request from the first access network node, where the third response includes the endpoint information of the second transmission path on the third access network node side.

According to a third aspect, another communication method is provided, including: receiving, by a third access network node from a first access network node, endpoint information of a second transmission path on a second access network node side; and sending, by the third access network node to the first access network node, endpoint information of the second transmission path on the third access network node side.

Optionally, the third access network node receives a first request from the first access network node, and the third access network node sends a first response to the first access network node based on the first request.

Optionally, the first response includes the endpoint information of the second transmission path on the third access network node side.

Optionally, after sending, to the first access network node, the endpoint information of the second transmission path on the third access network node side, the third access network node may receive, from the first access network node, the endpoint information of the second transmission path on the second access network node side.

Optionally, the first request includes the endpoint information of the second transmission path on the second access network node side. In this case, after receiving, from the first access network node, the endpoint information of the second transmission path on the second access network node side, the third access network node sends, to the first access network node, the endpoint information of the second transmission path on the third access network node side.

According to a fourth aspect, another communication method is provided, including: sending, by a first access network node, a request message to a third access network node; and receiving, by the first access network node, a response message to the request message from the third access network node.

According to a fifth aspect, another communication method is provided, including: receiving, by a third access network node, a request message from a first access network node; configuring, by the third access network node, an SRB based on the request message; and sending, by the third access network node, a response message to the first access network node.

In a possible implementation of the fifth aspect, the request message is used to establish a transmission path corresponding to the SRB.

Optionally, the request message includes at least one piece of the following information: information about the SRB, endpoint information of the transmission path on the first access network node side, and configuration information of at least one protocol layer of the third access network node, where the transmission path is a path that is between the first access network node and the third access network node and that is corresponding to the SRB.

Optionally, the endpoint information that is of the transmission path on the first access network node side and that is included in the request message may specifically include a UL GTP-U TEID and/or a transport layer address such as an IP address.

Optionally, the information about the SRB may include identifier information of the SRB.

Optionally, the response message may include endpoint information of the transmission path on the third access network node side, for example, a DL GTP-U TEID and/or an IP address.

Therefore, according to the communication method, the transmission path corresponding to the SRB can be established between the first access network node and the third access network node, thereby establishing a control plane.

According to a sixth aspect, another communication method is provided, including: sending, by a first source access network node, a first handover request to a first target access network node, where the first handover request includes endpoint information that is of a transmission path between a core network and a second source access network node and that is on the core network side; receiving, by the first source access network node, a first handover response from the first target access network node, where the first handover response includes endpoint information that is of a data forwarding path corresponding to a terminal device and that is on a second target access network node side; sending, by the first source access network node, first indication information to the second source access network node, where the first indication information includes the endpoint information of the data forwarding path on the second target access network node side; and sending, by the first source access network node, second instruction information to a third source access network node, where the second instruction information is used to instruct the third source access network node to release configuration of the terminal device.

According to a seventh aspect, another communication method is provided, including: receiving, by a first target access network node, a first handover request from a first source access network node, where the first handover request includes endpoint information that is of a transmission path between a core network and a second source access network node and that is on the core network side; sending, by the first target access network node, a second handover request to a second target access network node based on the first handover request; receiving, by the first target access network node, a second handover response to the second handover request from the second target access network node, where the second handover response includes endpoint information of the data forwarding path on the second target access network side; and sending, by the first target access network node, a first handover response to the first source access network node, where the first handover response includes the endpoint information of the data forwarding path on the second target access network side.

According to an eighth aspect, a communications apparatus is provided, configured to perform the method in any one of the first aspect or the possible implementations of the first aspect.

Specifically, the apparatus includes a unit configured to perform the method in any one of the first aspect or the possible implementations of the first aspect.

According to a ninth aspect, another communications apparatus is provided, configured to perform the method in any one of the second aspect or the possible implementations of the second aspect.

Specifically, the apparatus includes a unit configured to perform the method in any one of the second aspect or the possible implementations of the second aspect.

According to a tenth aspect, another communications apparatus is provided, configured to perform the method in any one of the third aspect or the possible implementations of the third aspect.

Specifically, the apparatus includes a unit configured to perform the method in any one of the third aspect or the possible implementations of the third aspect.

According to an eleventh aspect, another communications apparatus is provided, configured to perform the method in any one of the fourth aspect or the possible implementations of the fourth aspect.

Specifically, the apparatus includes a unit configured to perform the method in any one of the fourth aspect or the possible implementations of the fourth aspect.

According to a twelfth aspect, another communications apparatus is provided, configured to perform the method in any one of the fifth aspect or the possible implementations of the fifth aspect.

Specifically, the apparatus includes a unit configured to perform the method in any one of the fifth aspect or the possible implementations of the fifth aspect.

According to a thirteenth aspect, another communications apparatus is provided, configured to perform the method in any one of the sixth aspect or the possible implementations of the sixth aspect.

Specifically, the apparatus includes a unit configured to perform the method in any one of the sixth aspect or the possible implementations of the sixth aspect.

According to a fourteenth aspect, another communications apparatus is provided, configured to perform the method in any one of the seventh aspect or the possible implementations of the seventh aspect.

Specifically, the apparatus includes a unit configured to perform the method in any one of the seventh aspect or the possible implementations of the seventh aspect.

According to a fifteenth aspect, another communications apparatus is provided, including a memory and a processor, where the memory is configured to store an instruction, the processor is configured to execute the instruction stored in the memory, and when the processor executes the instruction stored in the memory, the execution enables the processor to perform the method in any one of the first aspect or the possible implementations of the first aspect.

According to a sixteenth aspect, another communications apparatus is provided, including a memory and a processor, where the memory is configured to store an instruction, the processor is configured to execute the instruction stored in the memory, and when the processor executes the instruction stored in the memory, the execution enables the processor to perform the method in any one of the second aspect or the possible implementations of the second aspect.

According to a seventeenth aspect, another communications apparatus is provided, including a memory and a processor, where the memory is configured to store an instruction, the processor is configured to execute the instruction stored in the memory, and when the processor executes the instruction stored in the memory, the execution enables the processor to perform the method in any one of the third aspect or the possible implementations of the third aspect.

According to an eighteenth aspect, another communications apparatus is provided, including a memory and a processor, where the memory is configured to store an instruction, the processor is configured to execute the instruction stored in the memory, and when the processor executes the instruction stored in the memory, the execution enables the processor to perform the method in any one of the fourth aspect or the possible implementations of the fourth aspect.

According to a nineteenth aspect, another communications apparatus is provided, including a memory and a processor, where the memory is configured to store an instruction, the processor is configured to execute the instruction stored in the memory, and when the processor executes the instruction stored in the memory, the execution enables the processor to perform the method in any one of the fifth aspect or the possible implementations of the fifth aspect.

According to a twentieth aspect, another communications apparatus is provided, including a memory and a processor, where the memory is configured to store an instruction, the processor is configured to execute the instruction stored in the memory, and when the processor executes the instruction stored in the memory, the execution enables the processor to perform the method in any one of the sixth aspect or the possible implementations of the sixth aspect.

According to a twenty-first aspect, another communications apparatus is provided, including a memory and a processor, where the memory is configured to store an instruction, the processor is configured to execute the instruction stored in the memory, and when the processor executes the instruction stored in the memory, the execution enables the processor to perform the method in any one of the seventh aspect or the possible implementations of the seventh aspect.

According to a twenty-second aspect, a computer readable storage medium is provided, where the computer readable storage medium stores an instruction, and when the instruction is run on a computer, a computer is enabled to perform the communication method in any one of the foregoing aspects.

According to a twenty-third aspect, a computer program product that includes an instruction is provided, where when the computer program product is run on a computer, the computer is enabled to perform the communication method in any one of the foregoing aspects.

According to a twenty-fourth aspect, a radio access network is provided, including the apparatus in any one of the eighth aspect or the possible implementations of the eighth aspect, the apparatus in any one of the ninth aspect or the possible implementations of the ninth aspect, and the apparatus in any one of the tenth aspect or the possible implementations of the tenth aspect; or including the apparatus in any one of the fifteenth aspect or the possible implementations of the fifteenth aspect, the apparatus in any one of the sixteenth aspect or the possible implementations of the sixteenth aspect, and the apparatus in any one of the seventeenth aspect or the possible implementations of the seventeenth aspect.

According to a twenty-fifth aspect, another radio access network is provided, including the apparatus in any one of the eleventh aspect or the possible implementations of the eleventh aspect and the apparatus in any one of the twelfth aspect or the possible implementations of the twelfth aspect; or including the apparatus in any one of the eighteenth aspect or the possible implementations of the eighteenth aspect and the apparatus in any one of the nineteenth aspect or the possible implementations of the nineteenth aspect.

According to a twenty-sixth aspect, another radio access network is provided, including the apparatus in any one of the thirteenth aspect or the possible implementations of the thirteenth aspect and the apparatus in any one of the fourteenth aspect or the possible implementations of the fourteenth aspect; or including the apparatus in any one of the twentieth aspect or the possible implementations of the twentieth aspect and the apparatus in any one of the twenty-first aspect or the possible implementations of the twenty-first aspect.

According to a twenty-seventh aspect, a processing apparatus is provided, including a processor and an interface, where the processor is configured to perform the method in any one of the foregoing aspects.

Optionally, the processing apparatus may be a chip.

In some aspects of this application, the first request includes configuration information of at least one protocol layer of the third access network node.

Optionally, the configuration information of the at least one protocol layer is associated with the DRB.

Optionally, the third access network node may configure the DRB based on the configuration information that is of the protocol layer and that is included in the first request.

In some aspects of this application, the second request includes configuration information of at least one protocol layer of the second access network node.

Optionally, the configuration information of the at least one protocol layer is associated with the DRB.

Optionally, the second access network node may configure the DRB based on the configuration information that is of the protocol layer and that is included in the second request.

In some aspects of this application, the second request includes endpoint information of a first transmission path on the core network side. The first transmission path is a transmission path that is between the core network and the second access network node and that is corresponding to the DRB.

Optionally, the first transmission path may be specifically a transmission path of the PDU session corresponding to the DRB, or may be a transmission path of the E-RAB corresponding to the DRB.

The second transmission path may be specifically a transmission path corresponding to the DRB.

Optionally, the second response further includes endpoint information of the first transmission path on the second access network node side.

In some aspects of this application, the core network may send information about a flow to the first access network node by using a control plane message.

Optionally, after obtaining the information about the flow from the core network, the first access network node may determine, based on the information about the flow, that the flow is mapped to the DRB, and send, to the second access network node, first indication information indicating a mapping relationship between the flow and the DRB.

Optionally, the second request includes the first indication information.

Optionally, the first access network node may send the information about the flow to the second access network node. After obtaining the information about the flow from the first access network node, the second access network node may determine, based on the information about the flow, that the flow is mapped to the DRB, and send, to the first access network node, first indication information indicating a mapping relationship between the flow and the DRB.

Optionally, the second request includes the information about the flow, and the second response includes the first indication information.

In some aspects of this application, the core network may send a data packet to the second access network node, and the second access network node may obtain, from the received data packet, information about a flow to which the data packet belongs.

Optionally, the second access network node may determine, based on the information that is about the flow and that is obtained from the data packet, that the flow is mapped to the DRB, and send, to the first access network node, first indication information indicating a mapping relationship between the flow and the DRB.

Optionally, before the second access network node sends the first indication information, the second access network node may further perform admission control on the flow, and after determining to accept the flow, send the first indication information to the first access network node.

Optionally, after receiving the first indication information, the first access network node may perform admission control on the flow, and after determining to accept the flow, send, to the second access network node, the endpoint information of the second transmission path on the third access network node.

Optionally, if the first access network node or the second access network node determines not to accept the flow or to reject the flow, the first access network node or the second access network node may send, to the core network, third indication information indicating that the flow is rejected. In an example, the first access network node or the second access network node may send the information about the flow to the core network, for example, an identifier of the flow.

Optionally, the third request includes the first indication information.

Optionally, the second access network node may send, to the first access network node, the information that is about the flow and that is obtained from the data packet. After obtaining the information about the flow from the second access network node, the first access network node may determine, based on the information about the flow, that the flow is mapped to the DRB, and send, to the second access network node, first indication information indicating a mapping relationship between the flow and the DRB.

Optionally, the information about the flow may include QoS information of the flow.

In some aspects of this application, the endpoint information may specifically include at least one of a UL GTP-U TEID and a transport layer address.

Optionally, the transport layer address may be specifically an IP address.

In some aspects of this application, the endpoint information that is of the transmission path between the core network and the second source access network node, that is on the core network side, and that is included in the first handover request may specifically include a UL GTP-U TEID and/or a transport layer address.

In some aspects of this application, the endpoint information of the data forwarding path may include endpoint information of a path used to forward uplink data and/or endpoint information of a path used to forward downlink data.

In some aspects of this application, an access network device is separated into a central node and a distributed node controlled by the central node.

In some aspects of this application, the first access network node and the second access network node are jointly used as a central node, and the third access network node is used as a distributed node. The first access network node has a control plane function of the central node, and the second access network node has a user plane function of the central node.

In some aspects of this application, the first access network node may be specifically a CU-C, the second access network node may be specifically a CU-U, and the third access network node may be specifically a DU.

DESCRIPTION OF EMBODIMENTS

The following describes technical solutions of this application with reference to accompanying drawings.

The technical solutions in the embodiments of this application may be applied to various communications systems in which functions of an access network device are separated, for example, a global system for mobile communications (GSM), a code division multiple access (CDMA) system, a wideband code division multiple access (WCDMA) system, a general packet radio service (GPRS) system, a long term evolution (LTE) system, an LTE frequency division duplex (FDD) system, an LTE time division duplex (TDD) system, a universal mobile telecommunications system (UMTS), a worldwide interoperability for microwave access (WiMAX) communications system, a future evolved public land mobile network (PLMN), or a future 5G system such as new radio (NR) system or evolved LTE (eLTE) system.

For ease of understanding, the following is described by using an example in which the embodiments of this application are applied to a CRAN scenario in the 5G system. However, the embodiments of this application may be further applied to other scenarios in which functions of an access network device are separated. For example, in the LTE system, there is a radio remote scenario (that is, a baseband module and a radio frequency module are separated), a dual connectivity (DC) scenario, a macro-micro cell scenario, an LTE-Wi-Fi aggregation (LWA) scenario, and the like. In the 5G system, there are various non-cell scenarios (a terminal device may be freely handed over between cells, and there is no definite boundary between cells), various virtualization scenarios, and the like. Alternatively, this application may be applied to a scenario in which different systems/standards coexist. This is not limited in the embodiments of this application.

Figure 1:
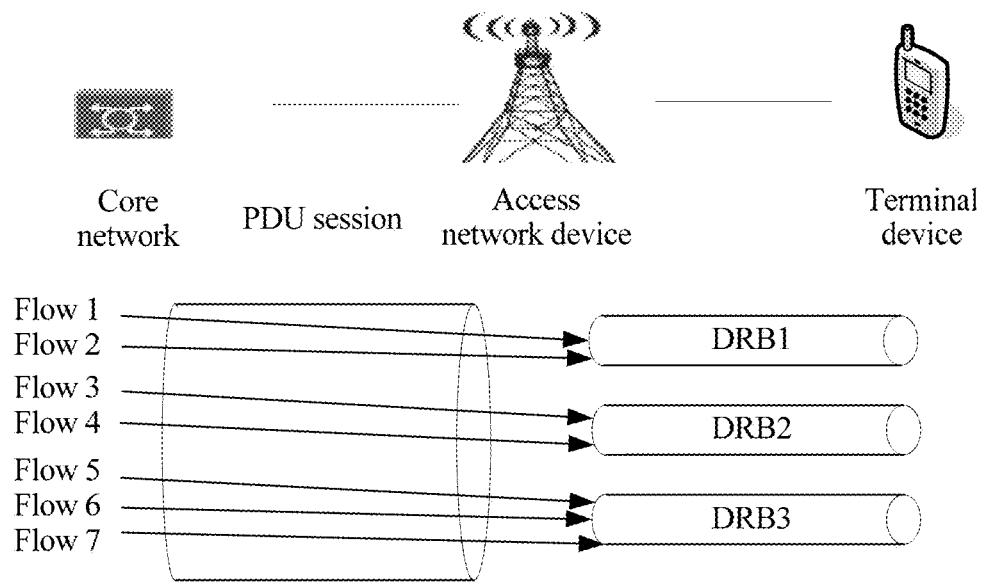
FIG. 1 is a schematic diagram of an example of an application scenario according to an embodiment of this application.

A wireless communications system to which the embodiments of this application are applied may include a core network (CN) and a radio access network (RAN). A protocol data unit (PDU) session may be established between the CN and the RAN. The PDU session may include at least one service data flow on a user plane. On the RAN side, a data flow may be mapped to a data radio bearer (DRB) based on different quality of service (QoS) requirements. An example of a PDU session and a mapping relationship between a data flow and a DRB may be shown in FIG. 1.

In the wireless communications system, an access network device may be separated into at least two access network nodes, and a standard or non-standard interface may exist between the at least two access network nodes.

It should be understood that in the embodiments of this application, the access network device may be a device that communicates with the terminal device. The access network device may provide communication coverage for a specific geographic area, and may communicate with a terminal device (for example, UE) located in the coverage area. Optionally, the access network device may be a base transceiver station (BTS) in a GSM system or a CDMA system, or may be a NodeB (NB) in a WCDMA system, or may be an evolved NodeB (eNB or eNodeB) in an LTE system, or may be a radio controller in a cloud radio access network (CRAN). Alternatively, the access network device may be a relay node, an access point (access point, AP), a vehicle-mounted device, a wearable device, a network side device such as a gNB or a transmission point in a future 5G network, a network device in a future evolved PLMN, or the like.

It should also be understood that, the terminal device may be mobile or fixed in the embodiments of this application. The terminal device may be an access terminal, user equipment (UE), a subscriber unit, a subscriber station, a mobile station, a remote station, a remote terminal, a mobile device, a user terminal, a terminal, a wireless communications device, a user agent, or a user apparatus. The access terminal may be a cellular phone, a cordless phone, a session initiation protocol (SIP) phone, a wireless local loop (WLL) station, a personal digital assistant (PDA), a handheld device with a wireless communication function, a computing device or another processing device connected to a wireless modem, a vehicle-mounted device, a wearable device, a terminal device in a future 5G network, a terminal device in a future evolved PLMN, or the like.

In an example, in the CRAN scenario, the access network device may be separated into a control unit (CU) and a data unit (DU). Alternatively, the control unit may be also referred to as a central unit (CU), or may have another name, and the data unit may be also referred to as a distributed unit (DU), or may have another name. This is not limited in the embodiments of this application. The CU may have some of or all radio resource control RRC) functions, or further have functions of one or more protocol layers below an RRC layer. For example, the CU may only have some of or all RRC layer functions, or have all RRC layer functions and some of or all packet data convergence protocol (PDCP) layer functions, or have RRC layer functions, PDCP layer functions, and some of or all radio link control (RLC) layer functions, or have RRC layer functions, PDCP layer functions, RLC layer functions, and some of or all media access control (MAC) layer functions, or may further have some physical (PHY) layer functions. This is not limited in the embodiments of this application.

Optionally, the DU may have some of or all PHY layer functions, or further have functions of one or more protocol layers above a PHY layer. For example, the DU may have some of or all RRC layer functions, PDCP layer functions, RLC layer functions, MAC layer functions, and PHY layer functions, or have some of or all PDCP layer functions, RLC layer functions, MAC layer functions, and PHY layer functions, or have some of or all RLC layer functions, MAC layer functions, and PHY layer functions, or have only all or some PHY layer functions. This is not limited in the embodiments of this application.

In addition, to separate a user plane (user plane, UP) function and a control plane (CP) function inside the CU, the CU may be divided into a user plane (user plane in CU, CU-U) entity in the CU and a control plane (control plane in CU, CU-C) entity in the CU. The CU-C may be responsible for processing and transmission of control-related information in the CU, and the CU-U may be responsible for processing and transmission of data-related information in the DU.

Figure 2:
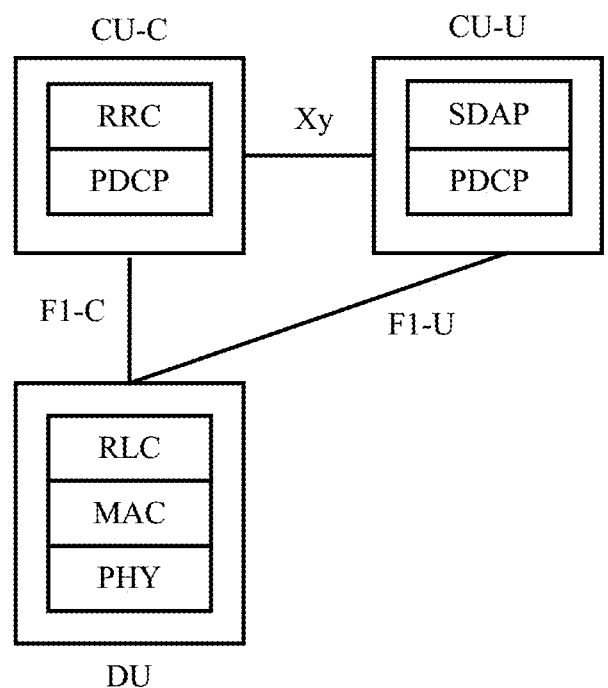
FIG. 2 is a schematic diagram of an example in which functions of an access network device are separated in an application scenario according to an embodiment of this application.

FIG. 2 shows a possible implementation of a protocol stack for each of a DU, a CU-C and a CU-U. As shown in FIG. 2, a CU and the DU are separated at a PDCP/RLC layer. The DU includes a PHY layer, a MAC layer, and the RLC layer, and the CU includes the PDCP layer and a layer above the PDCP layer. The CU is divided into two parts: the CU-C and the CU-U. The CU-C includes the PDCP layer and an RRC layer. The CU-U includes the PDCP layer and a newly added service data adaptation protocol (service data adaptation protocol, SDAP) layer. The SDAP layer may be responsible for QoS-related access, including routing from a QoS flow to a DRB, marking of an identifier (ID) of an uplink/downlink QoS flow, and the like. Due to separation between the CU and the DU, an interface F1 is added between the CU and the DU. Due to separation between a user plane and a control plane on the CU side, an interface Xy is added between the CU-C and the CU-U. In addition, the interface F1 between the CU and the DU may be further divided into F1-C (control plane interface) and F1-U (user plane interface). It should be understood that, names of the foregoing interfaces are examples and impose no limitation, and the foregoing interfaces may further have other names. This is not limited in the embodiments of this application.

With CU-DU separation and separation between the user plane and the control plane on the CU side, some existing solutions are no longer applicable. For example, how to establish a user plane and a control plane, how to hand over a terminal device, and other processes are not resolved.

It should be understood that, the example in FIG. 2 is intended to help a person skilled in the art better understand the embodiments of this application, instead of limiting the scope of the embodiments of this application. Apparently, a person skilled in the art can make various equivalent modifications or changes based on the example provided above, and such modifications or changes also fall within the application scope of the embodiments of this application.

It should also be understood that, in descriptions of the following embodiments, a first access network node, a second access network node, and a third access network node may be configured to jointly implement functions of an access network device. Specifically, the access network device may be divided into a central node and a distributed node. The first access network node may be configured to implement a control plane of the central node, that is, the first access network node may have a control plane function of the central node. The second access network node may be configured to implement a user plane of the central node, that is, the second access network node may have a user plane function of the central node. The third access network node may be configured to implement the distributed node, that is, the third access network node may have a function of the distributed node. In an example, the first access network node may be specifically a CU-C, the second access network node may be specifically a CU-U, and the third access network node may be specifically a DU. However, this is not limited in the embodiments of this application.

Figure 3:
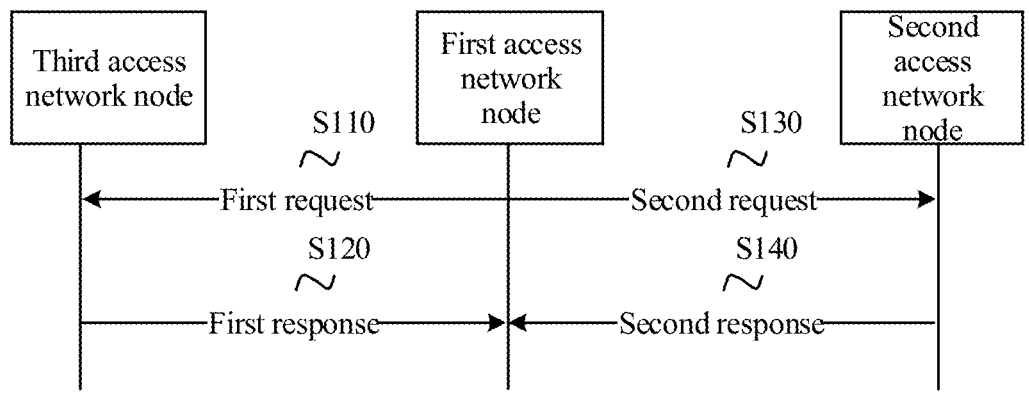
FIG. 3 is a schematic flowchart of a communication method according to an embodiment of this application.

FIG. 3 shows a communication method 100 according to an embodiment of this application. The communication method 100 may be used to establish a user plane. Specifically, the method 100 may be used to establish transmission paths corresponding to a DRB. The transmission paths corresponding to the DRB may include a first transmission path and a second transmission path. The first transmission path may be established between a second access network node and a core network, and the second transmission path may be established between the second access network node and a third access network node.

In the method 100, a first access network node may separately obtain endpoint information of the second transmission path on the second access network node and endpoint information of the second transmission path on the third access network node, notify the third access network node of the endpoint information of the second transmission path on the second access network node, and notify the second access network node of the endpoint information of the second transmission path on the third access network node.

In an optional embodiment, the first access network node may initiate establishment of the transmission paths corresponding to the DRB.

S110. The first access network node sends a first request to the third access network node.

The first access network node may send the first request to the third access network node. The first request may be used to request to establish a user plane on the third access network node; in other words, the first request may be specifically a first user plane establishment request. The first request may be used to request to establish one or more user planes. This is not limited in this embodiment of this application. Specifically, the first request may be used to request to establish a transmission path, namely, the second transmission path, that is between the third access network node and the second access network node and that is corresponding to the DRB. Optionally, the second transmission path may be specifically a GPRS tunneling protocol-user plane (GTP-U) tunnel, a signaling control transmission protocol (SCTP) tunnel, or another tunnel. However, this is not limited in this embodiment of this application.

Optionally, the first request may include configuration information of the DRB. Optionally, the configuration information of the DRB may include identifier information of the DRB and/or QoS information corresponding to the DRB. However, this is not limited in this embodiment of this application. Optionally, the first request may include configuration information of at least one protocol layer of the third access network node, and the at least one protocol layer may be used to transmit data on the DRB and/or process data transmitted on the DRB. For example, the at least one protocol layer may include a PHY layer, or include a PHY layer and a MAC layer, or include a PHY layer, a MAC layer, and an RLC layer, or include a PHY layer, a MAC layer, an RLC layer, and a PDCP layer, and the like. This is not limited in this embodiment of this application. Optionally, configuration information of the PHY layer may include at least one piece of the following information: configuration information of a physical downlink shared channel (PDSCH), configuration information of a physical uplink control channel (PUCCH), configuration information of a physical uplink shared channel (PUSCH), configuration information of uplink power control, configuration information of channel quality indicator (CQI) reporting, configuration information of an antenna (for example, a transmission mode of the antenna), and configuration information of semi-static scheduling. Optionally, configuration information of the MAC layer may include at least one piece of the following information: information about a buffer status report (BSR) timer, configuration information of discontinuous reception (DRX), information about a time alignment timer (time alignment timer, TA Timer), and configuration information of a scheduling request. Optionally, configuration information of the RLC layer may include mode information of the RLC layer. Optionally, configuration information of the PDCP layer may include key information of a user plane. Optionally, one or more of the configuration information of the PHY layer, the configuration information of the MAC layer, the configuration information of the RLC layer, and the configuration information of the PDCP layer may include other information. This is not limited in this embodiment of this application.

S120. After receiving the first request sent by the first access network node, the third access network node may send a first response to the first access network node.

Optionally, after receiving the first request, the third access network node may configure the DRB. For example, the third access network node may configure the at least one protocol layer used for the DRB. After completing the configuration, the third access network node may send the first response to the first access network node, to indicate that the third access network node completes the configuration of the DRB. Optionally, the third access network node may determine the endpoint information of the second transmission path on the third access network node side. Correspondingly, the first response may include the endpoint information of the second transmission path on the third access network node side. Optionally, the endpoint information may include a GTP-U tunnel endpoint identifier (TEID) and/or a transport layer address. The transport layer address may be specifically an IP address such as an IPV4 address or an IPV6 address. However, this is not limited in this embodiment of this application. The GTP-U TEID may be used by the second access network node to transmit downlink (DL) data. Correspondingly, the GTP-U TEID may be also referred to as a DL GTP-U TEID. However, this is not limited in this embodiment of this application.

S130. The first access network node sends a second request to the second access network node.

The first access network node may send the second request to the second access network node, to request to establish a user plane on the second access network node. Specifically, the second request may be used to request to establish the second transmission path.

Optionally, the second request may include the identifier information of the DRB.

Optionally, the second request may include endpoint information of the first transmission path on a core network side. The first transmission path is a transmission path between the core network and the second access network node, and the transmission path may be used to transmit data carried over the DRB. For example, the first transmission path may be specifically a transmission path that is between the core network and the second access network node and that is established for an evolved radio access bearer (E-RAB). There is a one-to-one mapping relationship between the E-RAB and the DRB. For another example, the first transmission path may be specifically a transmission path that is between the core network and the second access network node and that is established for a PDU session. The PDU session includes at least one flow, and after the at least one flow arrives at a radio access network (RAN), the RAN maps the at least one flow to the DRB. However, this is not limited in this embodiment of this application. Optionally, the endpoint information of the first transmission path on the core network side may specifically include a GTP-U TEID and/or a transport layer address. The GTP-U TEID may be used by the second access network node to transmit uplink data. Correspondingly, the GTP-U TEID may be also referred to as a UL GTP-U TEID. However, this is not limited in this embodiment of this application.

Optionally, the second request may include configuration information of each of at least one protocol layer of the second access network node, and the at least one protocol layer may be used to transmit data on the DRB and/or process data transmitted on the DRB. Optionally, the at least one protocol layer may include a PDCP layer, or a PDCP layer and another layer, for example, the PDCP layer and an SDAP layer. The second request may carry configuration information of some or all of one or more protocol layers used to process data carried on the DRB. However, this is not limited in this embodiment of this application.

S140. After receiving the second request sent by the first access network node, the second access network node sends a second response to the first access network node based on the second request.

After receiving the second request, the second access network node may configure the user plane on the second access network node. For example, the second access network node may configure the at least one protocol layer of the second access network node. After completing the configuration, the second access network node may send the second response to the first access network node, to indicate that the second access network node completes the configuration of the DRB. The second access network node may further determine endpoint information of the first transmission path on the second access network node and/or the endpoint information of the second transmission path on the second access network node. Optionally, the second response may include at least one piece of the following information: the endpoint information of the first transmission path on the second access network node side and the endpoint information of the second transmission path on the second access network node side. Optionally, the endpoint information herein may include a GTP-U TEID and/or a transport layer address. However, this is not limited in this embodiment of this application.

In this embodiment of this application, optionally, the first access network node may determine a mapping relationship between the DRB and a flow (namely, a data flow), and adds, into the second request, first indication information used to indicate the mapping relationship between the DRB and the flow.

There may be a mapping relationship between the DRB and at least one flow, that is, one or more flows may be mapped to the DRB.

Optionally, the first indication information may include an identifier and/or QoS information of at least one flow mapped to the DRB.

Optionally, the first access network node may obtain information about a flow, for example, QoS information of the flow, and determine, based on the information about the flow, that the flow is mapped to the DRB, that is, determine that there is a mapping relationship between the flow and the DRB. In an optional example, the first access network node may obtain the information about the flow from the core network. For example, the first access network node may receive control signaling from the core network, and the control signaling includes the information about the flow. However, this is not limited in this embodiment of this application.

In another optional example, the first access network node may obtain the information about the flow from the second access network node. For example, the second access network node may receive a data packet from the core network. The data packet may include information about a flow to which the data packet belongs. For example, a header of the data packet may include information about a flow corresponding to the data packet. However, this is not limited in this embodiment of this application. In this case, the second access network node may obtain the information about the flow from the data packet, and send, to the first access network node, the information about the flow to which the data packet belongs. However, this is not limited in this embodiment of this application.

In this case, optionally, after obtaining the information about the flow, the first access network node may perform admission control (admission control), to determine whether to accept the flow. For example, the first access network node may determine, based on a current network status such as a load status of the radio access network, whether to accept the flow; or the first access network node may determine, based on a fact whether a QoS requirement of the flow can be satisfied, whether to accept the flow. In this embodiment of this application, no limitation is imposed on specific implementation of performing admission control by the first access network node.

Optionally, if the first access network node determines to accept the flow, the first access network node may perform the foregoing procedure, that is, establish the transmission paths corresponding to the DRB. Optionally, if the first access network node determines not to accept the flow, the first access network node may send, to the core network, indication information used to indicate that the flow is rejected, and/or the information about the flow, for example, an identifier of the flow. This is not limited in this embodiment of this application.

In another optional embodiment, the second access network node may determine a mapping relationship between the DRB and a flow, and send, to the first access network node, first indication information indicating the mapping relationship between the DRB and the flow. However, this is not limited in this embodiment of this application.

In this embodiment of this application, the second access network node may determine the mapping relationship between the DRB and the flow in a plurality of manners, that is, determine at least one flow that has a mapping relationship with the DRB. Optionally, the first access network node may notify the second access network node of information about the flow. The information about the flow may include an identifier of the flow and/or QoS information of the flow, or may include other information. This is not limited in this embodiment of this application. The second access network node may determine the mapping relationship between the DRB and the flow based on the information that is about the flow and that is sent by the first access network node, that is, determine that the flow is mapped to the DRB. Optionally, the second access network node may determine the mapping relationship between the DRB and the flow based on a data packet received from the core network. For example, a header of the data packet includes information about a flow corresponding to the data packet, and the second access network node may obtain the information about the flow from the data packet, and determine that the flow is mapped to the DRB. However, this is not limited in this embodiment of this application.

Optionally, the second access network node may send, to the first access network node, a third request that includes the first indication information. Optionally, the third request may further include the information about the flow and/or the endpoint information of the second transmission path on the second access network node, or may further include other information. This is not limited in this embodiment of this application.

Optionally, after receiving the third request, the first access network node may send, to the third access network node, the first request that includes endpoint information of the second transmission path on the second access network node, and after receiving endpoint information of the second transmission path on the third access network node, send a third response to the second access network node. The third response includes the endpoint information of the second transmission path on the third access network node. However, this is not limited in this embodiment of this application.

In an optional embodiment, before the second access network node sends the third request to the first access network node, the second access network node may further perform admission control on the flow, and after determining to accept the flow, sends the third request to the first access network node. However, this is not limited in this embodiment of this application.

In another optional embodiment, after receiving the third request, the first access network node may perform admission control on the flow based on the information that about the flow and that is included in the third request, and after determining to accept the flow, sends, to the third access network node, the endpoint information of the second transmission path on the second access network node. However, this is not limited in this embodiment of this application.

Optionally, if the first access network node or the second access network node determines not to accept the flow, that is, to reject the flow, the first access network node or the second access network node may send, to the core network, third indication information indicating that the flow is not accepted. Specifically, indication may be explicitly or implicitly performed. In an example, the first access network node or the second access network node may feed back the information about the flow to the core network, for example, the identifier of the flow. However, this is not limited in this embodiment of this application.

Optionally, the first access network node may further send, to a terminal device by using the third access network node, second indication information used to indicate the mapping relationship between the DRB and the flow. For example, the first access network node may send RRC signaling to the terminal device by using the third access network node. The RRC signaling includes the second indication information used to indicate the mapping relationship between the DRB and the flow. However, this is not limited in this embodiment of this application. Optionally, after receiving the second indication information sent by the first access network node, the third access network node may transparently transmit the second indication information, or process the second indication information and then send the second indication information to the terminal device. This is not limited in this embodiment of this application.

In an example, when the DRB is initially configured, the first access network node may send the mapping relationship between the DRB and the flow to the terminal device. When another flow of the terminal device is mapped to the established DRB, the terminal device may determine a mapping relationship between the flow and the DRB through learning. Correspondingly, the first access network node may not send the mapping relationship between the flow and the DRB to the terminal device. Alternatively, the core network may notify the terminal device of the mapping relationship between the DRB and the flow. For example, the first access network node does not know the mapping relationship between the DRB and the flow and/or information about the flow. In this case, the core network may send QoS information of the flow to the terminal device by using a non-access stratum (non-access stratum, NAS) message, and send an identifier of the flow to the second access network node through a next generation-user plane (next generation-user plane, NG-U) interface. However, this is not limited in this embodiment of this application.

In this embodiment of this application, S130 and S110 may be simultaneously performed, or may be performed in any sequence. This is not limited in this embodiment of this application.

In an optional embodiment, S130 may be performed after S110 and S120, that is, after receiving the first response sent by the third access network node, the first access network node may send the second request to the second access network node. In this case, optionally, the second request may include the endpoint information of the second transmission path on the third access network node side. In this way, the second access network node may obtain, from the second request, the endpoint information of the second transmission path on the third access network node side, and adds, into the second response, the endpoint information of the second transmission path on the second access network node side. Optionally, after receiving the second response, the first access network node may send indication information to the third access network node, to indicate the endpoint information that is of the second transmission path on the second access network node side and that is included in the second response. However, this is not limited in this embodiment of this application.

In another optional embodiment, S110 may be performed after S130 and S140, that is, after receiving the second response sent by the second access network node, the first access network node may send the first request to the third access network node. In this case, optionally, the first request may include the endpoint information of the second transmission path on the second access network node side. In this way, the third access network node may obtain, from the first request, the endpoint information of the second transmission path on the second access network node side, and adds, into the first response, the endpoint information of the second transmission path on the third access network node side. Optionally, after receiving the first response, the first access network node may send indication information to the second access network node, to indicate the endpoint information that is of the second transmission path on the third access network node side and that is included in the first response. However, this is not limited in this embodiment of this application.

In this embodiment of this application, optionally, the endpoint information of the second transmission path on the third access network node side may be configured by the first access network node, or may be determined by the third access network node. Optionally, if the first access network node finds that the endpoint information of the second transmission path on the third access network node side is changed, the first access network node may notify the second access network node of modified endpoint information of the second transmission path on the third access network node side by using a modification procedure. For example, the first access network node may send, to the second access network node, indication information used to indicate the modified endpoint information of the second transmission path on the third access network node side. However, this is not limited in this embodiment of this application.

In another optional embodiment, the second access network node may initiate establishment of the transmission paths corresponding to the DRB.

Specifically, the second access network node may send the third request to the first access network node. The third request includes the first indication information indicating the mapping relationship between the DRB and the flow.

Optionally, the third request may further include the endpoint information of the second transmission path on the second access network node side and/or the endpoint information of the first transmission path on the second access network node side.

The first access network node may send the third response to the second access network node based on the third request.

Optionally, the third response may include the endpoint information of the second transmission path on the third access network node side and/or the endpoint information of the first transmission path on the third access network node side.

Optionally, after receiving the third request, the first access network node may send the first request to the third access network node, and after receiving the first response, send the third response to the second access network node. However, this is not limited in this embodiment of this application.

Optionally, the third response may include the configuration information of the at least one protocol layer of the second access network node.

Therefore, according to the communication method provided in this embodiment of this application, the transmission paths corresponding to the DRB can be established among a plurality of access network nodes, thereby improving system feasibility.

Specifically, when an access network device is separated into a CU-C, a CU-U, and a DU, transmission paths that are corresponding to a DRB and that include a first transmission path between the CU-U and a core network and a second transmission path between the CU-U and the DU may be established.

With reference to a specific example, the following describes in detail the communication method provided in the embodiments of this application. In the following example, it is assumed that the first access network node is a CU-C, the second access network node is a CU-U, and the third access network node is a DU. However, this is not limited in the embodiments of this application.

Figure 4:
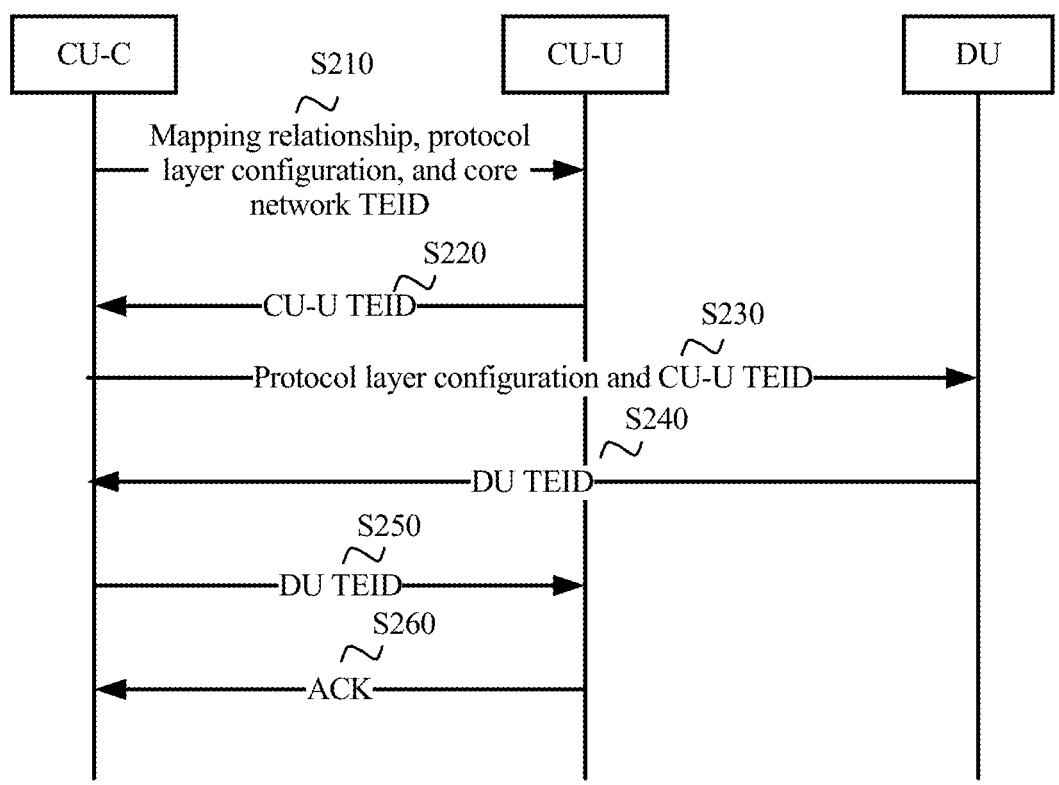
FIG. 4 is a schematic flowchart of another communication method according to an embodiment of this application.

FIG. 4 shows another communication method 200 according to an embodiment of this application. In the method 200, a core network notifies a CU-C of information about a flow by using a control plane message, and the CU-C determines a mapping relationship between the flow and a DRB.

S210. The CU-C sends, to a CU-U, first indication information indicating a mapping relationship between a flow and a DRB, configuration information of at least one protocol layer of the CU-U, and endpoint information that is of a transmission path corresponding to the DRB and that is on the core network side, for example, a core network TEID.

Optionally, the CU-C may send a second request to the CU-U, to request to establish the transmission path corresponding to the DRB. In this case, the second request includes the first indication information, the configuration information of the at least one protocol layer of the CU-U, and the endpoint information that is of the transmission path corresponding to the DRB and that is on the core network side.

In an example, the configuration information of the at least one protocol layer of the CU-U may include at least one of configuration information of SDAP layer and configuration information of PDCP layer.

S220. After receiving the foregoing information from the CU-C, the CU-U sends, to the CU-C, endpoint information that is of the transmission path corresponding to the DRB and that is on the CU-U side, for example, a CU-U TEID.

Optionally, the endpoint information on the CU-U side may include at least one of the following: information about an endpoint at which the CU-U faces the core network, namely, endpoint information of a first transmission path on the CU-U side, for example, a TEID that is briefly referred to as a UL TEID below, and information about an endpoint at which the CU-U faces the DU, namely, endpoint information of a second transmission path on the CU-U side, for example, a TEID that is briefly referred to as a DL TEID below.

Optionally, after receiving the foregoing information, the CU-U may configure the DRB.

Optionally, the CU-U may send a second response to the CU-C, and the second response includes the endpoint information that is of the transmission path corresponding to the DRB and that is on the CU-U side.

S230. The CU-C sends, to the DU, configuration information of at least one protocol layer of the DU and the endpoint information on the CU-U side, for example, the CU-U TEID.

In an example, the configuration information of the at least one protocol layer of the DU may include at least one of configuration information of RLC layer, configuration information of MAC layer, and configuration information of PHY layer.

Optionally, the CU-C may send a first request to the DU, and the first request includes the configuration information of the at least one protocol layer of the DU and the endpoint information on the CU-U side.

Optionally, the CU-U TEID may be specifically a CU-U DL TEID.

S240. After receiving the foregoing information from the CU-C, the DU may send, to the CU-C, endpoint information that is of the transmission path corresponding to the DRB and that is on the DU side, for example, a DU TEID.

Optionally, after receiving the foregoing information from the CU-C, the DU may configure the DRB.

Optionally, the DU may send a first response to the CU-C, and the first response includes the endpoint information that is of the transmission path corresponding to the DRB and that is on the DU side.

S250. After receiving the endpoint information on the DU side from the DU, the CU-C may send the endpoint information on the DU side to the CU-U.

S260. After receiving the endpoint information on the DU side from the CU-C, the CU-U may return an acknowledgement (ACK) to the CU-C.

In this way, the transmission path that is between the DU and the core network and that is corresponding to the DRB is established.

Figure 5:
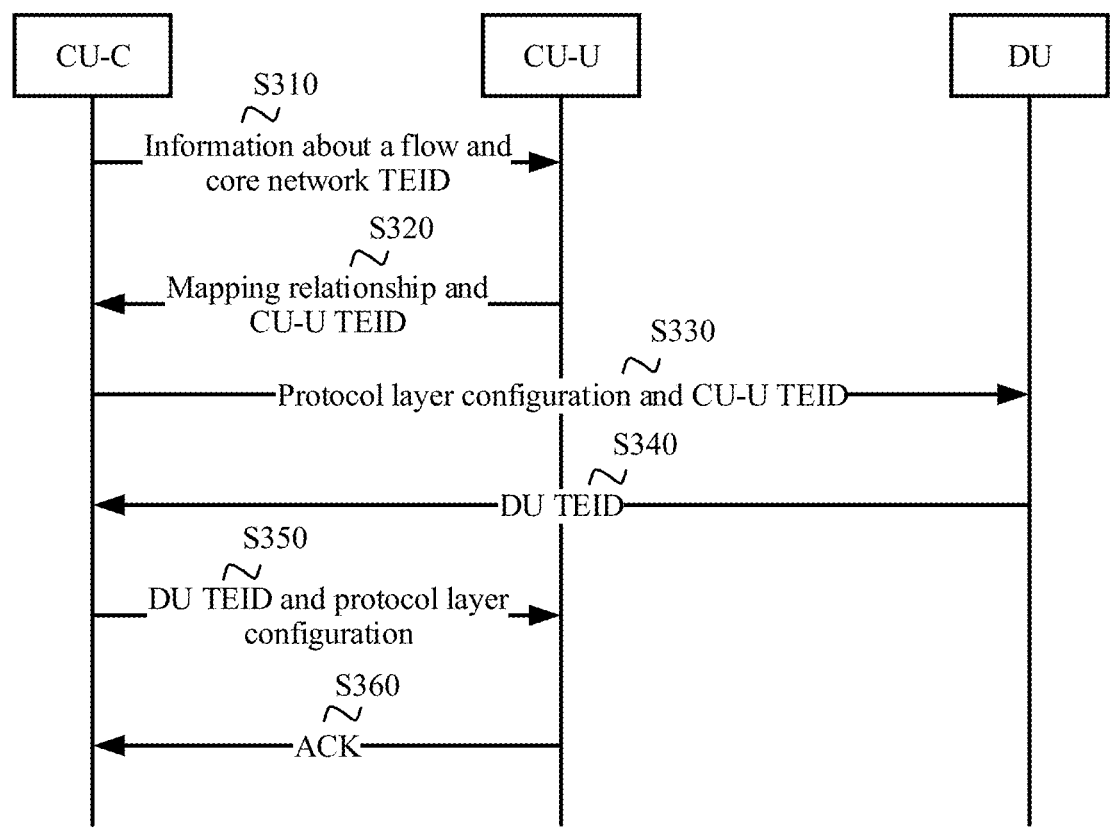
FIG. 5 is a schematic flowchart of another communication method according to an embodiment of this application.

FIG. 5 shows another communication method 300 according to an embodiment of this application. In the communication method 300, a core network notifies a CU-C of information about a flow by using a control plane message, the CU-C notifies a CU-U of the information about the flow, and the CU-U determines a mapping relationship between the flow and a DRB, and then notifies the CU-C of the mapping relationship.

S310. The CU-C sends, to the CU-U, information about a flow and endpoint information that is of a transmission path corresponding to a DRB and that is on the core network side, for example, a core network TEID.

Optionally, the information about the flow may include identifier information and/or QoS information of the flow.

Optionally, the CU-C may send a second request to the CU-U, and the second request includes the information about the flow and the endpoint information that is of the transmission path corresponding to the DRB and that is on the core network side.

S320. After receiving the foregoing information from the CU-C, the CU-U may send, to the CU-C, first indication information indicating a mapping relationship between the flow and the DRB and endpoint information that is of the transmission path corresponding to the DRB and that is on the CU-U side, for example, a CU-U TEID.

After receiving the information about the flow, the CU-U may determine, based on the information about the flow, that the flow is mapped to the DRB.

Optionally, the endpoint information on the CU-U side may include at least one of a UL TEID and a DL TEID.

Optionally, the CU-U may send a second response to the CU-C, and the second response includes the first indication information and the endpoint information that is of the transmission path corresponding to the DRB and that is on the CU-U side.

S330. The CU-C sends, to a DU, configuration information of at least one protocol layer of the DU and the endpoint information that is of the transmission path corresponding to the DRB and that is on the CU-U side, for example, the CU-U TEID.

Optionally, the CU-U TEID herein may be specifically a CU-U DL TEID.

Optionally, the CU-C may send a first request to the DU, and the first request includes the configuration information of the at least one protocol layer of the DU and the endpoint information that is of the transmission path corresponding to the DRB and that is on the CU-U side.

S340. After obtaining the foregoing information from the CU-C, the DU may send, to the CU-C, endpoint information that is of the transmission path corresponding to the DRB and that is on the DU side, for example, a DU TEID.

Optionally, after obtaining the configuration information of the at least one protocol layer, the DU may configure the DRB.

Optionally, the DU may send a first response to the CU-C, and the first response includes the endpoint information that is of the transmission path corresponding to the DRB and that is on the DU side.

S350. After obtaining the endpoint information on the DU side from the DU, the CU-C may send the endpoint information on the DU side and configuration information of at least one protocol layer of the CU-U to the CU-U.

S360. After receiving the endpoint information on the DU side and the protocol layer configuration from the CU-C, the CU-U may send an acknowledgement message such as an ACK to the CU-C.

Figure 6:
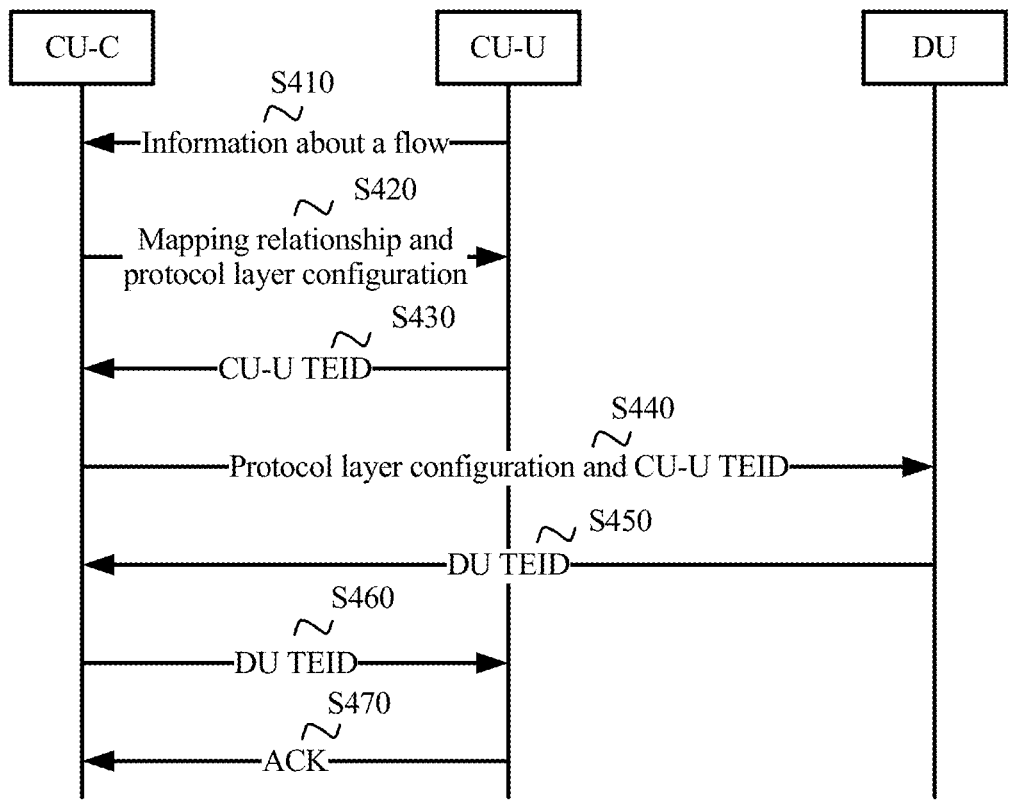
FIG. 6 is a schematic flowchart of another communication method according to an embodiment of this application.

FIG. 6 shows another communication method 400 according to an embodiment of this application. In the method, a core network sends a data packet to a CU-U. The CU-U obtains information about a flow by parsing the data packet, and notifies a CU-C of the information about the flow. The CU-C determines a mapping relationship between the flow and a DRB, and notifies the CU-U of the mapping relationship.

S410. The CU-U sends information about a flow to the CU-C.

S420. After receiving the information about the flow from the CU-U, the CU-C may send, to the CU-U, configuration information of at least one protocol layer of the CU-U and first indication information indicating a mapping relationship between the flow and a DRB.

Optionally, the CU-C may determine, based on the information about the flow, the DRB to which the flow is mapped.

Optionally, the CU-C may send a second request to the CU-U, and the second request includes the first indication information and the configuration information of the at least one protocol layer of the CU-U.

S430. After receiving the first indication information and the protocol layer configuration from the CU-C, the CU-U sends, to the CU-C, endpoint information that is of a transmission path corresponding to the DRB and that is on the CU-U side, for example, a CU-U TEID.

Optionally, the CU-U may configure the DRB based on the protocol layer configuration.

Optionally, the CU-U may determine, based on the first indication information, the endpoint information that is of the transmission path corresponding to the DRB and that is on the CU-U side.

Optionally, the CU-U may send a second response to the CU-C, and the second response includes the endpoint information that is of the transmission path corresponding to the DRB and that is on the CU-U side.

S440. After receiving the endpoint information on the CU-U side from the CU-U, the CU-C may send configuration information of at least one protocol layer of a DU and the endpoint information on the CU-U side to the DU.

Optionally, the CU-C may send a first request to the DU, and the first request includes the protocol layer configuration and the CU-U TEID.

S450. After receiving the protocol layer configuration and the endpoint information on the CU-U side from the CU-C, the DU may send endpoint information on the DU side to the CU-C.

Optionally, the DU may send a first response to the CU-C, and the first response includes a DU TEID.

S460. After receiving the endpoint information on the DU side from the DU, the CU-C sends the endpoint information on the DU side to the CU-U.

S470. After receiving the endpoint information on the DU side from the CU-C, the CU-U sends an acknowledgement message to the CU-C.

Figure 7:
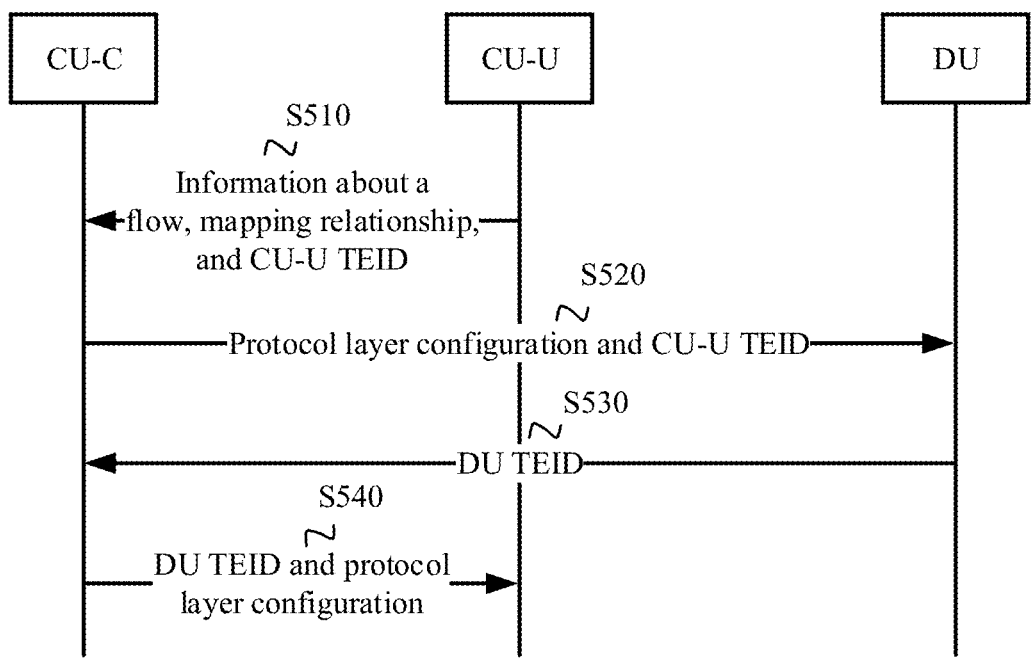
FIG. 7 is a schematic flowchart of another communication method according to an embodiment of this application.

FIG. 7 shows another communication method 500 according to an embodiment of this application. In the method, a core network sends a data packet to a CU-U. The CU-U obtains information about a flow by parsing the data packet, and the CU-U determines a mapping relationship between the flow and a DRB, and notifies a CU-C of the mapping relationship.

S510. The CU-U sends, to the CU-C, information about a flow, first indication information indicating a mapping relationship between the flow and a DRB, and endpoint information that is of a transmission path corresponding to the DRB and that is on the CU-U side.

Optionally, the CU-U may send a third request to the CU-C, and the third request includes the information about the flow, the first indication information, and the endpoint information that is of the transmission path corresponding to the DRB and that is on the CU-U side.

S520. After receiving the foregoing information from the CU-U, the CU-C sends configuration information of at least one protocol layer of a DU and the endpoint information on the CU-U side to the DU.

Optionally, the CU-C may send a first request to the DU, and the first request includes the protocol layer configuration of the DU and the endpoint information on the CU-U side.

S530. After receiving the foregoing information from the CU-C, the DU may send endpoint information on the DU side to the CU-C.

Optionally, the DU may send a first response to the CU-C, and the first response includes the endpoint information on the DU side.

S540. After receiving the endpoint information on the DU side from the DU, the CU-C may send the endpoint information on the DU side and configuration information of at least one protocol layer of the CU-U to the CU-U.

It should be understood that, the examples shown in FIG. 4 to FIG. 7 are intended to help a person skilled in the art better understand the embodiments of this application, instead of limiting the scope of the embodiments of this application. Apparently, a person skilled in the art can make various equivalent modifications or changes based on the examples provided above, and such modifications or changes also fall within the scope of the embodiments of this application.

Figure 8:
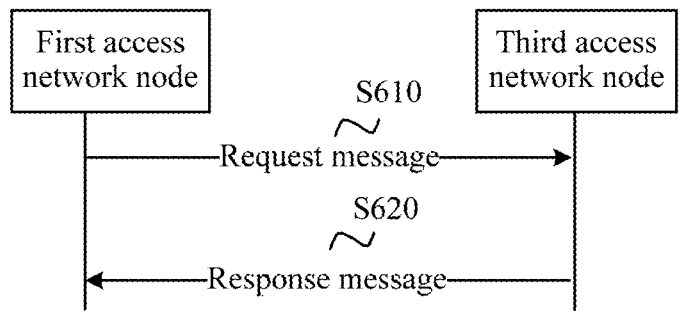
FIG. 8 is a schematic flowchart of another communication method according to an embodiment of this application.

FIG. 8 shows a communication method 600 according to another embodiment of this application. The method may be used to establish a control plane.

S610. A first access network node sends a request message to a third access network node, where the request message may be used to request to establish a control plane.

Optionally, the request message may be specifically a control plane establishment request. Optionally, the request message may be used to request to establish a third transmission path that is between the first access network node and the third access network node and that is corresponding to a signaling radio bearer (signaling radio bearer, SRB).

Optionally, the request message may include at least one piece of the following information: information about the SRB, endpoint information of the third transmission path on the first access network node side, and configuration information of at least one protocol layer of the third access network node. The third transmission path may be a transmission path that is between the first access network node and the third access network node and that is corresponding to the SRB. Optionally, the request message may include other information. This is not limited in this embodiment of this application.

Optionally, the request message may include information about one or more SRBs. For example, the request message may include information about an SRB1 and information about an SRB2. However, this is not limited in this embodiment of this application. The third access network node may include one or more protocol layers used for the SRB, for example, include a PHY layer, or include a PHY layer and a MAC layer, or include a PHY layer, a MAC layer, and an RLC layer, or include a PHY layer, a MAC layer, an RLC layer, and a PDCP layer. This is not limited in this embodiment of this application. The request message may include configuration information of some or all of the one or more protocol layers. Optionally, configuration information of the PHY layer may include at least one piece of the following information: configuration information of a PDSCH, configuration information of a PUCCH, configuration information of a PUSCH, configuration information of uplink power control, configuration information of CQI reporting, configuration information of an antenna (for example, a transmission mode of the antenna), and configuration information of semi-static scheduling. Optionally, configuration information of the MAC layer may include at least one piece of the following information: information about a BSR timer, configuration information of DRX, information about a TA timer, and configuration information of a scheduling request. Optionally, configuration information of the RLC layer may include mode information of the RLC layer. Optionally, configuration information of the PDCP layer may include key information of the user plane. Optionally, one or more of the configuration information of the PHY layer, the configuration information of the MAC layer, the configuration information of the RLC layer, and the configuration information of the PDCP layer may include other information. This is not limited in this embodiment of this application.

S620. After receiving the request message sent by the first access network node, the third access network node may configure the SRB based on the request message, and send a response message to the first access network node.

After receiving the request message, the third access network node may configure the SRB on the third access network node. For example, the third access network node may determine endpoint information of the third transmission path on the third access network node side, and/or configure the at least one protocol layer used for the SRB. After completing the configuration, the third access network node may send the response message to the first access network node, to indicate that the third access network node completes the configuration of the SRB. Optionally, the response message may include the endpoint information of the third transmission path on the third access network node side, for example, a GTP TEID and/or a transport layer address. Alternatively, the response message may include other information. This is not limited in this embodiment of this application.

Therefore, according to the communication method provided in this embodiment of this application, the transmission path corresponding to the SRB can be established between the first access network node and the third access network node, thereby improving system feasibility.

Specifically, when an access network device is separated into a CU-C, a CU-U, and a DU, a transmission path corresponding to an SRB may be established between the CU-C and the DU.

Figure 9:
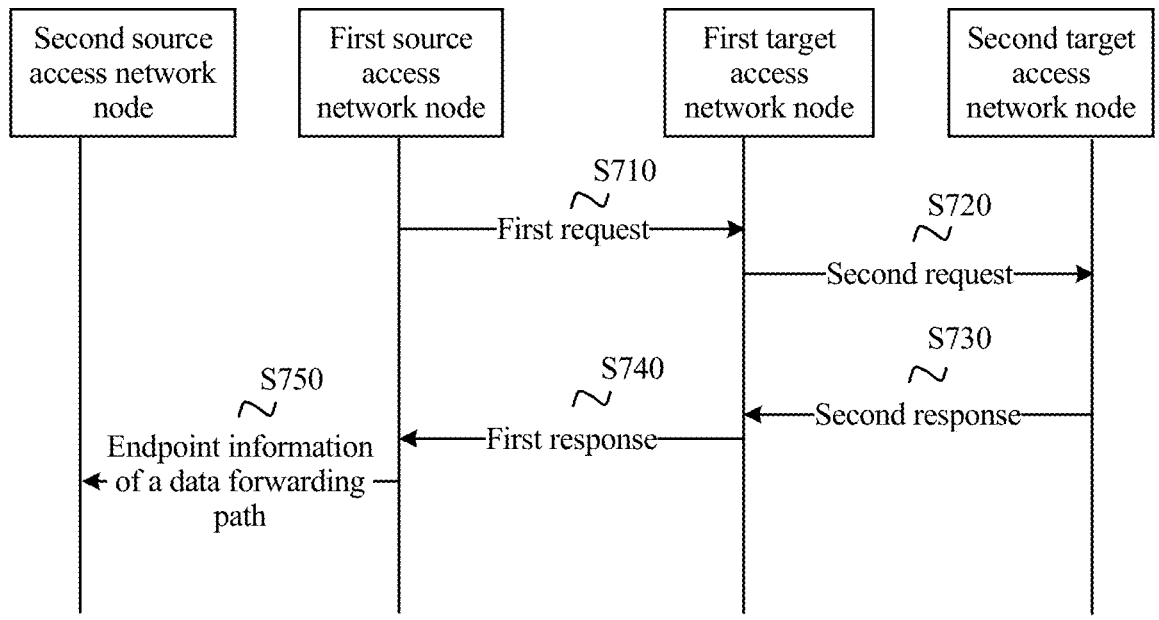
FIG. 9 is a schematic flowchart of another communication method according to an embodiment of this application.

FIG. 9 shows a communication method 700 according to another embodiment of this application. The method may be used to hand over a terminal device.

S710. The first source access network node sends a first request to a first target access network node. The first request may be used to request to hand over the terminal device to the first target access network node. Optionally, the first request may include endpoint information that is of a transmission path between a second source access network node and a core network and that is on the core network side, or may include other information. This is not limited in this embodiment of this application.

After receiving the first request sent by the first source access network node, the first target access network node may determine endpoint information of a data forwarding path corresponding to the terminal device.

Optionally, the data forwarding path may be established between the second source access network node and a second target access network node, and may be used by the second source access network node to forward data of the terminal device to the second target access network node. Optionally, the endpoint information of the data forwarding path may include endpoint information of a path used to forward uplink data and/or endpoint information of a path used to forward downlink data. This is not limited in this embodiment of this application.

In an optional implementation, the first target access network node may configure the data forwarding path based on the information included in the first request. For example, the first target access network node may allocate an endpoint of the data forwarding path. However, this is not limited in this embodiment of this application. In this case, optionally, the first target access network node may further send, to the second target access network node, indication information used to indicate the endpoint information of the data forwarding path. For example, the first target access network node may add the endpoint information of the data forwarding path into a second request sent to the second target access network node. However, this is not limited in this embodiment of this application.

S720. The first target access network node sends the second request to the second target access network node. In this case, optionally, the second request may include a part or all of the information included in the first request, for example, include the endpoint information that is of the transmission path between the second source access network node and the core network and that is on the core network side. However, this is not limited in this embodiment of this application.

S730. After receiving the second request, the second target access network node may configure the endpoint information of the data forwarding path, for example, a GTP TEID and/or a transport layer address, and send a second response to the first target access network node, where the second response includes the endpoint information of the data forwarding path.

Correspondingly, the first target access network node may obtain the endpoint information that is of the data forwarding path and that is included in the second response.

Optionally, the first target access network node may further determine the configuration information of the data forwarding path in another manner. This is not limited in this embodiment of this application.

S740. The first target access network node sends a first response to the first source access network node, where the first response includes the endpoint information of the data forwarding path.

S750. After receiving the first response sent by the first target access network node, the first source access network node may send the endpoint information of the data forwarding path to the second source access network node.

After receiving indication information sent by the first source access network node, the second source access network node may forward uplink and/or downlink data of the terminal device to the second target access network node through the data forwarding path based on the indication information.

Optionally, after completing forwarding of the uplink and/or downlink data that is of the terminal device and that is buffered by the second source access network node, the second source access network node may release configuration of the terminal device, for example, the second source access network node may discard context information of the terminal device. However, this is not limited in this embodiment of this application.

Optionally, the first source access network node may further send, to a third source access network node, indication information used to instruct the third source access network node to release the configuration of the terminal device. Correspondingly, the third source access network node may release the configuration of the terminal device. However, this is not limited in this embodiment of this application.

In an example, in this embodiment of this application, the first source access network node may be specifically a source CU-C, the second source access network node may be specifically a source CU-U, the third source access network node may be specifically a source DU, the first target access network node may be specifically a target CU-C, and the second target access network node may be specifically a target CU-U. However, this is not limited in this embodiment of this application.

Therefore, according to the communication method provided in this embodiment of this application, when a terminal device is handed over between access network nodes, data can be forwarded from a source access network node to a target access network node, thereby improving system feasibility.

It should be understood that, sequence numbers of the foregoing processes do not mean execution sequences. The execution sequences of the processes should be determined based on functions and internal logic of the processes, and should not be construed as any limitation on the implementation processes of the embodiments of this application.

It should also be understood that in the embodiments of this application, endpoint information of a transmission path on a node side may specifically include a GTP-U TEID and/or a transport layer address. The endpoint information may be used to transmit uplink data or transmit downlink data. Correspondingly, the GTP-U TEID may be represented as a UL GTP-U TEID or a DL GTP-U TEID based on a function of the endpoint information. However, this is not limited in this embodiment of this application.

Figure 10:
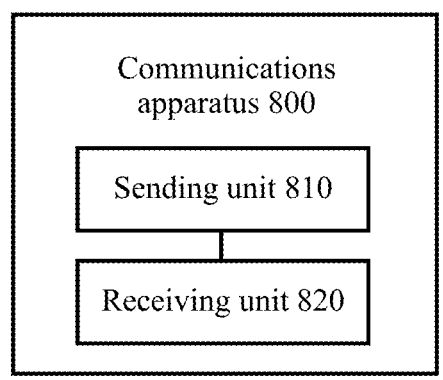
FIG. 10 is a schematic block diagram of a communications apparatus according to an embodiment of this application.
Figure 11:
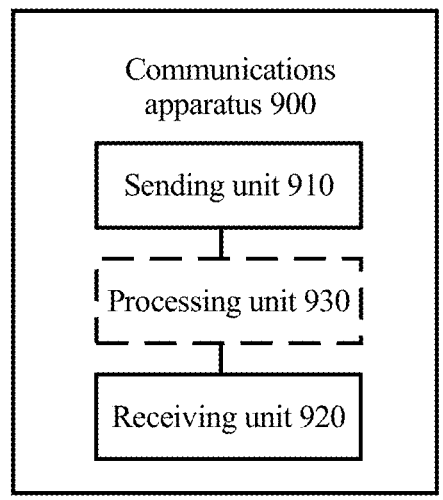
FIG. 11 is a schematic block diagram of another communications apparatus according to an embodiment of this application.
Figure 12:
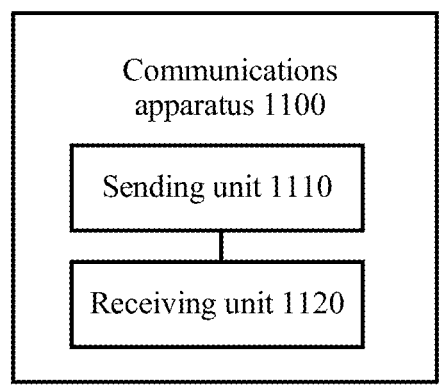
FIG. 12 is a schematic block diagram of another communications apparatus according to an embodiment of this application.

With reference to FIG. 1 to FIG. 9, the foregoing describes in detail the communication method according to the embodiments of this application. With reference to FIG. 10 to FIG. 12, the following describes in detail a communications apparatus according to the embodiments of this application.

FIG. 10 shows a communications apparatus 800 according to an embodiment of this application. The apparatus 800 may be specifically a CU-C. However, this is not limited in this embodiment of this application.

As shown in FIG. 10, the apparatus 800 includes a sending unit 810 and a receiving unit 820.

In an optional embodiment, the sending unit 810 is configured to: send, to a second access network node, endpoint information of a second transmission path on a third access network node, and send, to the third access network node, endpoint information of the second transmission path on the second access network node.

The receiving unit 820 may be configured to: receive, from the second access network node, the endpoint information of the second transmission path on the second access network node, and receive, from the third access network node, the endpoint information of the second transmission path on the third access network node.

Optionally, the sending unit 810 may be configured to send a first request to the third access network node. Correspondingly, the receiving unit 820 may be configured to receive, from the third access network node, a first response to the first request sent by the sending unit 810.

Optionally, the first response includes the endpoint information of the second transmission path on the third access network node.

Optionally, the sending unit 810 may be configured to send a second request to the second access network node. The receiving unit 820 is configured to receive, from the second access network node, a second response to the second request sent by the sending unit 810.

Optionally, the second response includes the endpoint information of the second transmission path on the second access network node.

Optionally, the sending unit 810 is specifically configured to: after the first response is received, send the second request to the second access network node. The second request further includes the endpoint information of the second transmission path on the third access network node side.

Correspondingly, the sending unit 810 is further configured to: after the receiving unit 820 receives the second response, send, to the third access network node, the endpoint information of the second transmission path on the second access network node side.

Optionally, the sending unit 810 is specifically configured to: after the second response is received, send the first request to the third access network node. The first request further includes the endpoint information of the second transmission path on the second access network node side.

Correspondingly, the sending unit 810 is further configured to: after the receiving unit 820 receives the first response, send, to the second access network node, the endpoint information of the second transmission path on the third access network node side.

Optionally, the apparatus 800 further includes a processing unit, configured to: obtain QoS information of a flow, and determine a mapping relationship between a DRB and the flow based on the QoS information of the flow. The second request includes first indication information indicating the mapping relationship.

Optionally, the second request includes the QoS information of a flow, and the second response includes first indication information indicating a mapping relationship.

Optionally, the receiving unit 820 is configured to receive a third request from the second access network node, and the sending unit 810 is configured to send a third response to the third request to the second access network node.

Optionally, the third request includes the endpoint information of the second transmission path on the second access network node and first indication information indicating a mapping relationship between a DRB and a flow.

In another optional embodiment, the sending unit 810 is configured to send a request message to a third access network node. The request message includes at least one piece of the following information: information about an SRB, endpoint information of a transmission path on a first access network node side, and configuration information of at least one protocol layer of the third access network node. The transmission path is a transmission path that is between the first access network node and the third access network node and that is corresponding to the SRB.

Correspondingly, the receiving unit 820 is configured to receive, from the third access network node, a response message to the request message sent by the sending unit 810. The response message includes endpoint information of the transmission path on the third access network node side.

It should be understood that, the communications apparatus 800 is embodied in a form of a function unit. In an optional example, a person skilled in the art may understand that, the communications apparatus 800 herein may be specifically the first access network node in the foregoing embodiments, and the communications apparatus 800 may be configured to perform procedures and/or steps that are corresponding to the first access network node in the foregoing method embodiments. To avoid repetition, details are not described herein again.

FIG. 11 shows another communications apparatus 900 according to an embodiment of this application. The apparatus 900 includes a sending unit 910 and a receiving unit 920.

In an optional embodiment, the apparatus 900 may be specifically a CU-U. However, this is not limited in this embodiment of this application.

Specifically, the sending unit 910 is configured to send, to a first access network node, endpoint information of a second transmission path on a second access network node side. The second transmission path is a transmission path that is between the second access network node and the third access network node and that is corresponding to a data radio bearer DRB.

The receiving unit 920 is configured to receive, from the first access network node, endpoint information of the second transmission path on the third access network node side.

Optionally, the receiving unit 920 is further configured to: before the sending unit 910 sends, to the first access network node, the endpoint information of the second transmission path on the second access network node side, receive a second request from the first access network node.

The sending unit 910 is specifically configured to send a second response to the first access network node based on the second request. The second response includes the endpoint information of the second transmission path on the second access network node side.

Optionally, the second request includes endpoint information of a first transmission path on a core network side, and the second response further includes endpoint information of the first transmission path on the second access network node side.

Optionally, the second request includes the endpoint information of the second transmission path on the third access network node side.

The receiving, by the second access network node from the first access network node, endpoint information of the second transmission path on the third access network node side includes:

Optionally, the receiving unit 920 is specifically configured to: after the sending unit 910 sends the second response to the first access network node, receive, from the first access network node, the endpoint information of the second transmission path on the third access network node side.

Optionally, the second request includes information about a flow. In this case, the apparatus 900 may further include a processing unit 930, configured to: before the sending unit 910 sends the second response to the first access network node, determine, based on the information that is about the flow and that is included in the second request, that the flow is mapped to the DRB. Correspondingly, the second response further includes indication information indicating a mapping relationship between the flow and the DRB.

Optionally, the second request includes indication information indicating a mapping relationship between a flow and the DRB.

Optionally, the receiving unit 920 is further configured to receive a data packet from the core network.

The processing unit 930 is configured to obtain, from the data packet, information about a flow to which the data packet belongs.

The sending unit 910 is further configured to send the information about the flow to the first access network node.

Optionally, the receiving unit 920 is further configured to receive a data packet from a core network.

The processing unit 930 is further configured to: obtain, from the data packet, information about a flow to which the data packet belongs, where the information about the flow includes QoS information of the flow, and determine, based on the information about the flow, that the flow is mapped to the DRB.

The sending unit 910 is configured to send a third request to the first access network node. The third request includes the endpoint information of the second transmission path on the second access network node side and indication information indicating a mapping relationship between the flow and the DRB.

The receiving unit 920 is specifically configured to receive a third response to the third request from the first access network node. The third response includes the endpoint information of the second transmission path on the third access network node side.

Optionally, the receiving unit 920 is further configured to receive configuration information of at least one protocol layer of the second access network node from the first access network node.

The processing unit 930 is configured to configure the DRB based on the configuration information of the at least one protocol layer of the second access network node.

In an optional example, a person skilled in the art may understand that, the communications apparatus 900 herein may be specifically the second access network node in the foregoing embodiments, and the communications apparatus 900 may be configured to perform procedures and/or steps that are corresponding to the second access network node in the foregoing method embodiments. To avoid repetition, details are not described herein again.

In another optional embodiment, the apparatus 900 may be specifically a DU. However, this is not limited in this embodiment of this application.

Specifically, the receiving unit 920 is configured to receive, from a first access network node, endpoint information of a second transmission path on a second access network node side.

The sending unit 910 is configured to send, to the first access network node, endpoint information of the second transmission path on a third access network node side.

Optionally, the receiving unit 920 is further configured to: before the sending unit 910 sends, to the first access network node, the endpoint information of the second transmission path on the third access network node side, receive a first request from the first access network node.

Correspondingly, the sending unit 910 is configured to send a first response to the first access network node based on the first request. The first response includes the endpoint information of the second transmission path on the third access network node side.

Optionally, the first request includes the endpoint information of the second transmission path on the second access network node side.

Optionally, the first request includes configuration information of at least one protocol layer of the third access network node.

The processing unit 930 may be configured to configure a DRB based on the configuration information of the at least one protocol layer.

Optionally, the receiving unit 920 may be specifically configured to: after the sending unit 910 sends the first response to the first access network node, receive, from the first access network node, the endpoint information of the second transmission path on the second access network node side.

In another optional embodiment, the receiving unit 920 is configured to receive a request message from a first access network node. The request message includes at least one piece of the following information: information about an SRB, endpoint information of a transmission path on the first access network node side, and configuration information of at least one protocol layer of a control plane on a third access network node. The transmission path is a transmission path that is between the first access network node and the third access network node and that is corresponding to the SRB.

The sending unit 910 is configured to send a response message to the first access network node. The response message includes endpoint information of the transmission path on the third access network node side.

Optionally, the processing unit 930 is configured to configure the SRB based on the configuration information that is of the at least one protocol layer and that is included in the request message.

In an optional example, a person skilled in the art may understand that, the communications apparatus 900 herein may be specifically the third access network node in the foregoing embodiments, and the communications apparatus 900 may be configured to perform procedures and/or steps that are corresponding to the third access network node in the foregoing method embodiments. To avoid repetition, details are not described herein again.

It should be understood that, the foregoing apparatus 700, apparatus 800, and apparatus 900 may be an independent device, or may be integrated into a same device. This is not limited in the embodiments of this application.

FIG. 12 shows another communications apparatus 1100 according to an embodiment of this application. The apparatus 1100 includes a sending unit 1110 and a receiving unit 1120.

In an optional embodiment, the sending unit 1110 is configured to send a first request to a first target access network node. The first request includes endpoint information that is of a transmission path between a core network and a second source access network node and that is on the core network side.

The receiving unit 1120 is configured to receive a first response to the first request from the first target access network node. The first response includes endpoint information that is of a data forwarding path corresponding to a terminal device and that is on a second target access network node side.

The sending unit 1110 is further configured to: send first indication information to the second source access network node, where the first indication information includes the endpoint information of the data forwarding path on the second target access network node side, and send second instruction information to a third source access network node, where the second instruction information is used to instruct the third source access network node to release configuration of the terminal device.

In an optional example, a person skilled in the art may understand that, the communications apparatus 1100 herein may be specifically the first source access network node in the foregoing embodiments, and the communications apparatus 1100 may be configured to perform procedures and/or steps that are corresponding to the first source access network node in the foregoing method embodiments. To avoid repetition, details are not described herein again.

In another optional embodiment, the receiving unit 1120 is configured to receive a first request from a first source access network node. The first request includes endpoint information that is of a transmission path between a core network and a second source access network node and that is on the core network side.

The sending unit 1110 is configured to send a second request to the second target access network node based on the first request received by the receiving unit 1120.

The receiving unit 1120 is further configured to receive, from the second target access network node, a second response to the second request sent by the sending unit 1110. The second response includes endpoint information of the data forwarding path on the second target access network side.

The sending unit 1110 is further configured to send a first response to the first source access network node. The first response includes the endpoint information of the data forwarding path on the second target access network side.

In an optional example, a person skilled in the art may understand that, the communications apparatus 1100 herein may be specifically the first target access network node in the foregoing embodiments, and the communications apparatus 1100 may be configured to perform procedures and/or steps that are corresponding to the first target access network node in the foregoing method embodiments. To avoid repetition, details are not described herein again.

It should also be understood that in the embodiments of this application, the term "unit" may be an application-specific integrated circuit (ASIC), an electronic circuit, a processor (for example, a shared processor, a dedicated processor, or a group processor) configured to execute one or more software or firmware programs, a memory, a merged logic circuit, and/or another appropriate component that supports the described functions.

Figure 13:
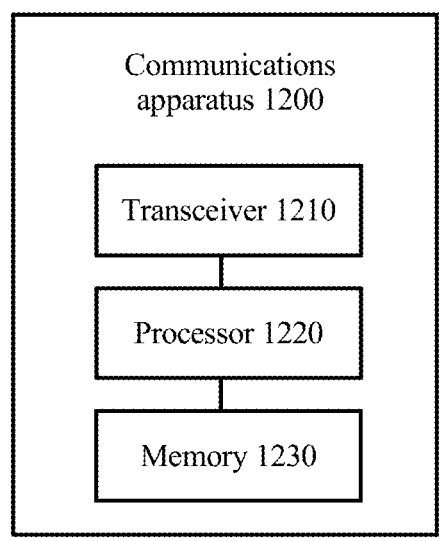
FIG. 13 is a schematic block diagram of another communications apparatus according to an embodiment of this application.

FIG. 13 shows a communications apparatus 1200 according to an embodiment of this application. The apparatus 1200 includes a transceiver 1210, a processor 1220, and a memory 1230. The transceiver 1210 is configured to receive/send data and/or signaling. The memory 1230 is configured to store an instruction. The processor 1220 is configured to execute the instruction stored in the memory 1230.

Optionally, the apparatus 1200 may be specifically a CU-C. However, this is not limited in this embodiment of this application.

In an optional embodiment, the transceiver 1210 is configured to:

send a first request to a third access network node, and send a second request to a second access network node, where the first request includes configuration information of a DRB, the second request includes endpoint information of a first transmission path on a core network side, and the first transmission path is a transmission path between the core network and the second access network node; and receive a first response to the first request from the third access network node, and receive a second response to the second request from the second access network node.

Optionally, the transceiver 1210 is specifically configured to: after receiving the first response, send the second request to the second access network node. The second request further includes endpoint information of a second transmission path on the third access network node side.

Correspondingly, the transceiver 1210 is further configured to: after receiving the second response, send, to the third access network node, endpoint information of the second transmission path on the second access network node side.

Optionally, the transceiver 1210 is specifically configured to: after receiving the second response, send the first request to the third access network node. The first request further includes endpoint information of a second transmission path on the second access network node side.

Correspondingly, the transceiver 1210 is further configured to: after receiving the first response, send, to the second access network node, endpoint information of the second transmission path on the third access network node side.

Optionally, execution of the instruction stored in the memory 1230 enables the processor to: obtain QoS information of a flow before the transceiver 1210 sends the second request to the second access network node, and determine a mapping relationship between the DRB and the flow based on the QoS information of the flow.

In an optional example, the transceiver 1210 is configured to: send, to a second access network node, endpoint information of a second transmission path on a third access network node, and send, to the third access network node, endpoint information of the second transmission path on the second access network node.

The transceiver 1210 may be further configured to: receive, from the second access network node, the endpoint information of the second transmission path on the second access network node, and receive, from the third access network node, the endpoint information of the second transmission path on the third access network node.

Optionally, the transceiver 1210 may be configured to send a first request to the third access network node. Correspondingly, the transceiver 1210 may be configured to receive, from the third access network node, a first response to the first request sent by the transceiver 1210.

Optionally, the first response includes the endpoint information of the second transmission path on the third access network node.

Optionally, the transceiver 1210 may be configured to send a second request to the second access network node. The transceiver 1210 is configured to receive a second response to the second request from the second access network node.

Optionally, the second response includes the endpoint information of the second transmission path on the second access network node.

Optionally, the transceiver 1210 is specifically configured to: after receiving the first response, send the second request to the second access network node. The second request further includes the endpoint information of the second transmission path on the third access network node side.

Correspondingly, the transceiver 1210 is further configured to: after the transceiver 1210 receives the second response, send, to the third access network node, the endpoint information of the second transmission path on the second access network node side.

Optionally, the transceiver 1210 is specifically configured to: after receiving the second response, send the first request to the third access network node. The first request further includes the endpoint information of the second transmission path on the second access network node side.

Correspondingly, the transceiver 1210 is further configured to: after receiving the first response, send, to the second access network node, the endpoint information of the second transmission path on the third access network node side.

Optionally, the processor 1220 is configured to: obtain QoS information of a flow, and determine a mapping relationship between a DRB and the flow based on the QoS information of the flow. The second request includes first indication information indicating the mapping relationship.

Optionally, the second request includes QoS information of a flow, and the second response includes first indication information indicating a mapping relationship.

Optionally, the transceiver 1210 is configured to: receive a third request from the second access network node, and send a third response to the third request to the second access network node.

Optionally, the third request includes the endpoint information of the second transmission path on the second access network node and first indication information indicating a mapping relationship between a DRB and a flow.

In another optional example, the transceiver 1210 is configured to send a request message to a third access network node. The request message includes at least one piece of the following information: information about an SRB, endpoint information of a transmission path on a first access network node side, and configuration information of at least one protocol layer of the third access network node. The transmission path is a transmission path that is between the first access network node and the third access network node and that is corresponding to the SRB.

Correspondingly, the transceiver 1210 is configured to receive a response message to the request message from the third access network node. The response message includes endpoint information of the transmission path on the third access network node side.

In an optional example, a person skilled in the art may understand that, the communications apparatus 1200 herein may be specifically the first access network node in the foregoing embodiments, and the communications apparatus 1200 may be configured to perform procedures and/or steps that are corresponding to the first access network node in the foregoing method embodiments. To avoid repetition, details are not described herein again.

In another optional embodiment, the apparatus 1200 may be specifically a CU-U. However, this is not limited in this embodiment of this application.

Specifically, the transceiver 1210 is configured to: send, to a first access network node, endpoint information of a second transmission path on a second access network node side, where the second transmission path is a transmission path that is between the second access network node and the third access network node and that is corresponding to a data radio bearer DRB, and receive, from the first access network node, endpoint information of the second transmission path on the third access network node side.

Optionally, the transceiver 1210 is further configured to: before sending, to the first access network node, the endpoint information of the second transmission path on the second access network node side, receive a second request from the first access network node.

The transceiver 1210 is specifically configured to send a second response to the first access network node based on the second request. The second response includes the endpoint information of the second transmission path on the second access network node side.

Optionally, the second request includes endpoint information of a first transmission path on a core network side, and the second response further includes endpoint information of the first transmission path on the second access network node side.

Optionally, the second request includes the endpoint information of the second transmission path on the third access network node side.

The receiving, by the second access network node from the first access network node, endpoint information of the second transmission path on the third access network node side includes:

Optionally, the transceiver 1210 is specifically configured to: after sending the second response to the first access network node, receive, from the first access network node, the endpoint information of the second transmission path on the third access network node side.

Optionally, the second request includes information about a flow. In this case, the processor 1220 is configured to: before the transceiver 1210 sends the second response to the first access network node, determine, based on the information that is about the flow and that is included in the second request, that the flow is mapped to the DRB. Correspondingly, the second response further includes indication information indicating a mapping relationship between the flow and the DRB.

Optionally, the second request includes indication information indicating a mapping relationship between a flow and the DRB.

Optionally, the transceiver 1210 is further configured to receive a data packet from the core network.

The processor 1220 is configured to obtain, from the data packet, information about a flow to which the data packet belongs.

The transceiver 1210 is further configured to send the information about the flow to the first access network node.

Optionally, the transceiver 1210 is further configured to receive a data packet from a core network.

The processor 1220 is further configured to: obtain, from the data packet, information about a flow to which the data packet belongs, where the information about the flow includes QoS information of the flow, and determine, based on the information about the flow, that the flow is mapped to the DRB.

The transceiver 1210 is configured to send a third request to the first access network node. The third request includes the endpoint information of the second transmission path on the second access network node side and indication information indicating a mapping relationship between the flow and the DRB.

The transceiver 1210 is specifically configured to receive a third response to the third request from the first access network node. The third response includes the endpoint information of the second transmission path on the third access network node side.

Optionally, the transceiver 1210 is further configured to receive configuration information of at least one protocol layer of the second access network node from the first access network node.

The processor 1220 is configured to configure the DRB based on the configuration information of the at least one protocol layer of the second access network node.

In an optional example, a person skilled in the art may understand that, the communications apparatus 1200 herein may be specifically the second access network node in the foregoing embodiments, and the communications apparatus 1200 may be configured to perform procedures and/or steps that are corresponding to the second access network node in the foregoing method embodiments. To avoid repetition, details are not described herein again.

In another optional embodiment, the apparatus 1200 may be specifically a DU. However, this is not limited in this embodiment of this application.

Specifically, in an optional example, the transceiver 1210 is configured to: receive, from a first access network node, endpoint information of a second transmission path on a second access network node side, and send, to the first access network node, endpoint information of the second transmission path on a third access network node side.

Optionally, the transceiver 1210 is further configured to: before sending, to the first access network node, the endpoint information of the second transmission path on the third access network node side, receive a first request from the first access network node.

Correspondingly, the transceiver 1210 is configured to send a first response to the first access network node based on the first request. The first response includes the endpoint information of the second transmission path on the third access network node side.

Optionally, the first request includes the endpoint information of the second transmission path on the second access network node side.

Optionally, the first request includes configuration information of at least one protocol layer of the third access network node.

The processor 1220 may be configured to configure a DRB based on the configuration information of the at least one protocol layer.

Optionally, the transceiver 1210 may be specifically configured to: after the transceiver 1210 sends the first response to the first access network node, receive, from the first access network node, the endpoint information of the second transmission path on the second access network node side.

In another optional example, the transceiver 1210 is configured to receive a request message from a first access network node. The request message includes at least one piece of the following information: information about an SRB, endpoint information of a transmission path on the first access network node side, and configuration information of at least one protocol layer of a control plane on a third access network node. The transmission path is a transmission path that is between the first access network node and the third access network node and that is corresponding to the SRB.

The transceiver 1210 is configured to send a response message to the first access network node. The response message includes endpoint information of the transmission path on the third access network node side.

Optionally, the processor 1220 is configured to configure the SRB based on the configuration information that is of the at least one protocol layer and that is included in the request message.

In an optional example, a person skilled in the art may understand that, the communications apparatus 1200 herein may be specifically the third access network node in the foregoing embodiments, and the communications apparatus 1200 may be configured to perform procedures and/or steps that are corresponding to the third access network node in the foregoing method embodiments. To avoid repetition, details are not described herein again.

In an optional embodiment, the transceiver 1210 is configured to:

send a first request to a first target access network node, where the first request includes endpoint information that is of a transmission path between a core network and a second source access network node and that is on the core network side;

receive a first response to the first request from the first target access network node, where the first response includes endpoint information that is of a data forwarding path corresponding to a terminal device and that is on a second target access network node side; and send first indication information to the second source access network node, where the first indication information includes the endpoint information of the data forwarding path on the second target access network node side, and send second instruction information to a third source access network node, where the second instruction information is used to instruct the third source access network node to release configuration of the terminal device.

In an optional example, a person skilled in the art may understand that, the communications apparatus 1200 herein may be specifically the first source access network node in the foregoing embodiments, and the communications apparatus 1200 may be configured to perform procedures and/or steps that are corresponding to the first source access network node in the foregoing method embodiments. To avoid repetition, details are not described herein again.

In another optional embodiment, the transceiver 1210 is configured to:

receive a first request from a first source access network node, where the first request includes endpoint information that is of a transmission path between a core network and a second source access network node and that is on the core network side;

send a second request to the second target access network node based on the received first request;

receive a second response to the second request from the second target access network node, where the second response includes endpoint information of the data forwarding path on the second target access network side; and send a first response to the first source access network node, where the first response includes the endpoint information of the data forwarding path on the second target access network side.

In an optional example, a person skilled in the art may understand that, the communications apparatus 1200 herein may be specifically the first target access network node in the foregoing embodiments, and the communications apparatus 1200 may be configured to perform procedures and/or steps that are corresponding to the first target access network node in the foregoing method embodiments. To avoid repetition, details are not described herein again.

It should be understood that in the embodiment of this application, the processor may be a central processing unit (CPU), or the processor may be another general purpose processor, a digital signal processor (DSP), an application-specific integrated circuit (ASIC), a field-programmable gate array (FPGA) or another programmable logic device, a discrete gate or transistor logic device, a discrete hardware component, or the like. The general purpose processor may be a microprocessor, or the processor may be any conventional processor or the like.

The memory may include a read-only memory and a random access memory, and provide an instruction and data for the processor. A part of the memory may further include a non-volatile random access memory. For example, the memory may further store information of a device type. The processor may be configured to execute the instruction stored in the memory. When the processor executes the instruction, the processor may perform the steps corresponding to the terminal device in the foregoing method embodiments.

An embodiment of this application further provides a radio access network. The radio access network may include a first access network node, a second access network node, and a third access network node. Specific implementation of the nodes may be described above. For brevity, details are not described herein again.

In an example, the radio access network may include a CU-C, a CU-U, and a DU. A specific architecture of the CU-C, the CU-U, and the DU may be optionally shown in FIG. 2. However, this is not limited in this embodiment of this application.

An embodiment of this application further provides a processing apparatus, including a processor and an interface.

The processor is configured to perform the method in the foregoing embodiments of this application.

The processing apparatus may be a chip. The processor may be implemented by using hardware or software. When the processor is implemented by using hardware, the processor may be a logic circuit, an integrated circuit, or the like. When the processor is implemented by using software, the processor may be a general purpose processor, and is implemented by reading software code stored in a memory. The memory may be integrated into the processor, or may be located outside the processor and exist independently.

For example, the processing apparatus may be a field-programmable gate array (FPGA), may be an application-specific integrated circuit (ASIC), may be a system on chip (SoC), may be a central processing unit (CPU), may be a network processor (NP), may be a digital signal processing circuit (digital signal processor, DSP), may be a micro controller unit (MCU), or may be a programmable logic device (PLD) or another integrated chip.

In an implementation process, steps in the foregoing methods can be completed by using an integrated logical circuit of hardware in the processor, or by using an instruction in a form of software. The steps in the methods disclosed with reference to the embodiments of this application may be directly performed and completed by a hardware processor, or may be performed and completed by using a combination of the hardware in the processor and a software module. The software module may be located in a mature storage medium in the art, such as a random access memory, a flash memory, a read-only memory, a programmable read-only memory, an electrically erasable programmable memory, or a register. The storage medium is located in a memory, and the processor executes an instruction in the memory and completes the steps in the foregoing methods in combination with the hardware in the processor. To avoid repetition, details are not described herein again.

It should be understood that, the foregoing descriptions of the embodiments of this application focus on differences between the embodiments. For same or similar parts that are not unmentioned, refer to these embodiments. For brevity, details are not described herein again.

In addition, the terms "system" and "network" may be used interchangeably in this specification. The term "and/or" in this specification describes only an association relationship for describing associated objects and represents that three relationships may exist. For example, A and/or B may represent the following three cases: Only A exists, both A and B exist, and only B exists. In addition, the character "/" in this specification generally indicates an "or" relationship between the associated objects.

A person of ordinary skill in the art may be aware that, units and algorithm steps in the examples described with reference to the embodiments disclosed in this specification may be implemented by electronic hardware or a combination of computer software and electronic hardware. Whether the functions are performed by hardware or software depends on particular applications and design constraints of the technical solutions. A person skilled in the art may use different methods to implement the described functions for each particular application, but it should not be considered that the implementation goes beyond the scope of this application.

It may be clearly understood by a person skilled in the art that, for the purpose of convenient and brief description, for a detailed working process of the foregoing system, apparatus, and unit, refer to a corresponding process in the foregoing method embodiments. Details are not described herein again.

In the several embodiments provided in this application, it should be understood that the disclosed system, apparatus, and method may be implemented in other manners. For example, the described apparatus embodiment is merely an example. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of the embodiments.

In addition, function units in the embodiments of this application may be integrated into one processing unit, or each of the units may exist alone physically, or two or more units may be integrated into one unit.

The foregoing embodiments may be all or partially implemented by using software, hardware, firmware, or any combination thereof. When software is used to implement the embodiments, the embodiments may be all or partially implemented in a form of a computer program product. The computer program product includes one or more computer instructions. When the computer program instructions are loaded and executed on a computer, the procedure or functions according to the embodiments of this application are all or partially generated. The computer may be a general-purpose computer, a dedicated computer, a computer network, or other programmable apparatuses. The computer instructions may be stored in a computer readable storage medium, or may be transmitted from a computer readable storage medium to another computer readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, or microwave) manner. The computer readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), a semiconductor medium (for example, a solid state disk (SSD)), or the like.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. A communication method, comprising:
    sending, by a second access network node to a first access network node, endpoint information of a second transmission path on the second access network node side, wherein the second transmission path is a transmission path that is between the second access network node and a third access network node;
    sending, by a third access network node to the first access network node, endpoint information of the second transmission path on the third access network node side;
    sending, by the first access network node to the second access network node, the endpoint information of the second transmission path on the third access network node side; and
    sending, by the first access network node to the third access network node, the endpoint information of the second transmission path on the second access network node side.

2. The method according to claim 1, wherein the method comprises:
    sending, by the first access network node, a first request to the third access network node; and
    wherein the sending, by the third access network node to the first access network node, endpoint information of the second transmission path on the third access network node side comprises:
    sending, by the third access network node, a first response to the first access network node, wherein the first response comprises the endpoint information of the second transmission path on the third access network node side.

3. The method according to claim 2, wherein the first request comprises the endpoint information of the second transmission path on the second access network node side, and wherein before the first access network node sends the first request to the third access network node, the method comprises:
    sending, by the second access network node to the first access network node, the endpoint information of the second transmission path on the second access network node side.

4. The method according to claim 1, wherein the method comprises:
    sending, by the first access network node, a second request to the second access network node; and
    wherein the sending, by the second access network node to the first access network node, endpoint information of a second transmission path on the second access network node side comprises:
    sending, by the second access network node, a second response to the first access network node, wherein the second response comprises the endpoint information of the second transmission path on the second access network node side.

5. The method according to claim 4, wherein the second request comprises endpoint information of a first transmission path on a core network side, wherein the second response further comprises endpoint information of the first transmission path on the second access network node side, and wherein the first transmission path is a transmission path that is between the core network and the second access network node.

6. A communication system, comprising:
    a first access network node, a second access network node and a third access network node;
    wherein the second access network node is configured to send endpoint information of a second transmission path on the second access network node side to the first access network node, and wherein the second transmission path is a transmission path that is between the second access network node and a third access network node;
    wherein the third access network node is configured to send endpoint information of the second transmission path on the third access network node side to the first access network node; and
    wherein the first access network node is configured to:
        send the endpoint information of the second transmission path on the third access network node side to the second access network node; and
        send the endpoint information of the second transmission path on the second access network node side to the third access network node.

7. The system according to claim 6, wherein the first access network node is configured to send a first request to the third access network node; and
    wherein the third access network node is configured to send a first response to the first access network node, and wherein the first response comprises the endpoint information of the second transmission path on the third access network node side.

8. The system according to claim 7, wherein the first request comprises the endpoint information of the second transmission path on the second access network node side, and wherein the second access network node is configured to send the endpoint information of the second transmission path on the second access network node side to the first access network node, before the first access network node sends the first request to the third access network node.

9. The system according to claim 6, wherein the first access network node is configured to send a second request to the second access network node; and
wherein the second access network node is configured to send a second response to the first access network node, and wherein the second response comprises the endpoint information of the second transmission path on the second access network node side.

10. The system according to claim 9, wherein the second request comprises endpoint information of a first transmission path on a core network side, wherein the second response further comprises endpoint information of the first transmission path on the second access network node side, and wherein the first transmission path is a transmission path that is between the core network and the second access network node.

11. A communication apparatus, comprising:
an interface circuitry and at least one processor, the at least one processor coupled with the interface circuitry;
wherein the at least one processor cooperates with the interface circuitry and is configured to perform operations comprising:
obtaining, from a second access network node, endpoint information of a second transmission path on the second access network node side, wherein the second transmission path is a transmission path that is between the second access network node and a third access network node;
obtaining, from the third access network node, endpoint information of the second transmission path on the third access network node side;
sending the endpoint information of the second transmission path on the third access network node side to the second access network node; and
sending the endpoint information of the second transmission path on the second access network node side to the third access network node.

12. The apparatus according to claim 11, wherein the at least one processor cooperates with the interface circuitry and is configured to perform operations comprises:
sending a first request to the third access network node; and
receiving a first response from the third access network node, wherein the first response comprises the endpoint information of the second transmission path on the third access network node side.

13. The apparatus according to claim 12, wherein the first request comprises the endpoint information of the second transmission path on the second access network node side, and wherein the at least one processor cooperates with the interface circuitry and is configured to perform operations comprises:
obtaining, from the second access network node, the endpoint information of the second transmission path on the second access network node side before the sending of the first request to the third access network node.

14. The apparatus according to claim 11, wherein the at least one processor cooperates with the interface circuitry and is configured to perform operations comprises:
sending a second request to the second access network node; and
receiving a second response from the second access network node, wherein the second response comprises the endpoint information of the second transmission path on the second access network node side.

15. The apparatus according to claim 14, wherein the second request comprises endpoint information of a first transmission path on a core network side, wherein the second response further comprises endpoint information of the first transmission path on the second access network node side, and wherein the first transmission path is a transmission path that is between the core network and the second access network node.

16. A communication apparatus, comprising:
an interface circuitry and at least one processor, the at least one processor coupled with the interface circuitry;
wherein the at least one processor cooperates with the interface circuitry and is configured to perform operations comprising:
sending endpoint information of a second transmission path on the apparatus side to a first access network node, wherein the second transmission path is a transmission path that is between the apparatus and a third access network node; and
receiving, from the first access network node, endpoint information of the second transmission path on the third access network node side.

17. The apparatus according to claim 16, wherein the at least one processor cooperates with the interface circuitry and is configured to perform operations comprising:
receiving a second request from the first access network node; and
sending a second response to the first access network node, wherein the second response comprises the endpoint information of the second transmission path on the second access network node side.

18. The apparatus according to claim 17, wherein:
the second request comprises endpoint information of a first transmission path on a core network side, the second response further comprises endpoint information of the first transmission path on the second access network node side, and the first transmission path is a transmission path that is between the core network and the second access network node; or
the second request comprises the endpoint information of the second transmission path on the third access network node side.

19. A communication apparatus, comprising:
an interface circuitry and at least one processor, the at least one processor coupled with the interface circuitry;
wherein the at least one processor cooperates with the interface circuitry and is configured to perform operations comprising:
receiving, from a first access network node, endpoint information of a second transmission path on a second access network node side, wherein the second transmission path is a transmission path that is between the second access network node and the apparatus; and
sending endpoint information of the second transmission path on the apparatus to the first access network node.

20. The apparatus according to claim 19, wherein the at least one processor cooperates with the interface circuitry and is configured to perform operations comprising:
- receiving a first request from the first access network node, wherein the first request comprises the endpoint information of the second transmission path on the second access network node side; and
- sending a first response to the first access network node, wherein the first response comprises the endpoint information of the second transmission path on the apparatus.

* * * * *